(12) United States Patent
Nakagawa

(10) Patent No.: US 8,719,726 B2
(45) Date of Patent: May 6, 2014

(54) VEHICULAR MANIPULATION INPUT APPARATUS

(75) Inventor: Kunihiro Nakagawa, Anjo (JP)

(73) Assignee: Denso Corporation, Kariya (JP)

(*) Notice: Subject to any disclaimer, the term of this patent is extended or adjusted under 35 U.S.C. 154(b) by 220 days.

(21) Appl. No.: 13/065,995

(22) Filed: Apr. 4, 2011

(65) Prior Publication Data

US 2011/0246934 A1  Oct. 6, 2011

(30) Foreign Application Priority Data

Apr. 5, 2010 (JP) ................. 2010-087254

(51) Int. Cl.
*G06F 3/14* (2006.01)

(52) U.S. Cl.
USPC ........... 715/802; 715/804; 345/156; 345/159; 382/133; 358/1.9; 156/67

(58) Field of Classification Search
USPC .......... 715/200–277, 700–867; 700/701–866; 709/201–229; 705/50–79; 345/30–111, 345/156; 156/67; 348/159
See application file for complete search history.

(56) References Cited

U.S. PATENT DOCUMENTS

| | | | |
|---|---|---|---|
| 7,142,890 B2 | 11/2006 | Irimajiri et al. | |
| 8,151,210 B2* | 4/2012 | Nezu et al. ................. | 715/804 |
| 8,189,900 B2* | 5/2012 | Sammak et al. ............ | 382/133 |
| 2005/0195157 A1* | 9/2005 | Kramer et al. ............. | 345/156 |
| 2005/0225638 A1* | 10/2005 | Tanaka et al. .............. | 348/159 |
| 2005/0264833 A1* | 12/2005 | Hiraoka et al. ............. | 358/1.9 |
| 2006/0174993 A1* | 8/2006 | Bery et al. .................. | 156/67 |
| 2009/0183978 A1 | 7/2009 | Asada | |

FOREIGN PATENT DOCUMENTS

| | | |
|---|---|---|
| JP | 8-255067 | 10/1996 |
| JP | 11-3198 | 1/1999 |
| JP | 2001-308991 | 11/2001 |
| JP | 2002-005679 | 1/2002 |
| JP | 2002-41205 | 2/2002 |
| JP | 2002-140144 | 5/2002 |
| JP | 2004-252760 | 9/2004 |
| JP | 2007-237986 | 9/2007 |
| JP | 2009-64638 | 3/2009 |
| JP | 2009-176432 | 8/2009 |

OTHER PUBLICATIONS

Office action dated Jun. 26, 2012 in corresponding Japanese Application No. 2010-87254.

* cited by examiner

*Primary Examiner* — Ruay Ho
(74) *Attorney, Agent, or Firm* — Harness, Dickey & Pierce, PLC

(57) ABSTRACT

In a hierarchical display structure, a high layer window contains one or more input images that serve as a window switchover region for switching into a low layer window. Each of the input images is a first correspondence image that has a unique color. When a manipulation device selects one of the input images and performs a determination input to the selected input image in the high layer window being displayed on a screen of a display device, the display on the screen is switched from the high layer window into the low layer window. The low layer window on the screen contains a background image as a second correspondence image that has a color identical to a color of the input image to which the determination input was performed in the high layer window.

13 Claims, 13 Drawing Sheets

HUE CIRCLE IN JIS Z 8721

VEHICULAR MANIPULATION INPUT APPARATUS

CROSS REFERENCE TO RELATED APPLICATION

The present application is based on and incorporates herein by reference Japanese Patent Application No. 2010-87254 filed on Apr. 5, 2010.

FIELD OF THE INVENTION

The present invention relates to a vehicular manipulation input apparatus in which a manipulation input is performed using a display window.

BACKGROUND OF THE INVENTION

[Patent document 1] JP-2004-252760 A

In vehicles such as a recent automobile, there is existing a manipulation input apparatus in which several selection regions (command switches) drawn on a display screen of a display device arranged in front of a driver are selected by a manipulation applied to a remote manipulation device arranged separately from the display device, thereby enabling a determination input (see Patent document 1). According to such a manipulation input apparatus, for example, for a driver to perform a touch typing without seeing switches or the like, the remote manipulation section may be arranged preferably in a position within reach of the hand of the driver such as a side of the driver's seat. It is thereby possible for the driver to manipulate while maintaining a posture for driving operation, thus providing an advantage in usability. In addition, in such a manipulation input apparatus, selection and determination made to the selection region in a display window enables a window switchover to transfer into a lower layer window. The repetitive switchover manipulation enables an arrival to a target window, in which an intended manipulation is executed.

However, in the above vehicular manipulation input apparatus, to improve the manipulability, the following request exits. That is, when the switchover to transfer into a lower layer window in a hierarchy structure is executed by the manipulation of selection and determination from several manipulation regions, a user would like to confirm later whether the manipulation is the same as the manipulator's intention.

For example, it is not so easy for a driver under a driving operation to continue seeing a display screen for a long time. There may be a case that a relatively long time elapses from when a first manipulation is made and to when a subsequent manipulation is then made. In such a case, the driver may forget what kind of manipulation was made in the previous first manipulation. Further, the driver may miss which layer of the hierarchy structure the present display window belongs to. In addition, a previous manipulation may be a mis-manipulation. When the driver thereafter sees a display window which has appeared after the manipulation, the driver may be not clear anymore why the intended display window is not displayed. In this case, the driver executes manipulations to return to the top menu window to resume hierarchical switchover manipulation from the start, posing a very troublesome.

SUMMARY OF THE INVENTION

It is an object of the present invention to provide a vehicular manipulation input apparatus in which when a switchover to transfer to a low layer window in a hierarchy structure is executed by a manipulation of selection and determination from several manipulation regions, it can be confirmed thereafter whether the manipulation is the same as a manipulator's intention.

To achieve the above object, according to an example of the present invention, a vehicular manipulation input apparatus is provided as follows. A display device is included to have a screen to display. A display control circuit is configured to cause the display device to display on the screen a selection-use window under a hierarchical structure, the selection-use window containing a plurality of selection regions. A manipulation device is included to select one of the plurality of selection regions in the selection-use window and perform a determination input to the selected one. Herein, the selection-use window includes a high layer window, the high layer window containing, within the plurality of selection regions, at least one window switchover region, which enables a window switchover to switch from the high layer window to a predetermined low layer window when receiving the determination input performed by the manipulation device. The display control circuit is further configured to: (i) display, in the high layer window, a first correspondence image, the first correspondence image (a) indicating visually a correspondence relation with the window switchover region, and (b) having at least one of a color and a patterned design, the at least one of the color and the patterned design being unique to the window switchover region; (ii) switch into the low layer window corresponding to the window switchover region when the manipulation device selects the window switchover region out of the plurality of selection regions and performs the determination input to the selected window switchover region; and (iii) display, in the low layer window, a second correspondence image, the second correspondence image having a visual association, in respect of at least one of a color and a patterned design, with the first correspondence image corresponding to the window switchover region to which the determination input was performed by the manipulation device.

Under the above configuration, an effect is provided as follows. The corresponding first correspondence image is displayed in a manner to indicate each window switchover region in the high layer window. When the window switchover region is selected and determined with a manipulation, the low layer window appears accordingly. In the low layer window, the second correspondence image is displayed which has a visual association with the first correspondence image that indicates the window switchover region to which the determination manipulation is applied in the high layer window. Only by seeing the low layer window, the window switchover region performed with the determination input manipulation in the high layer window can be imagined or associated easily, thereby enabling intuitive recognition of what kind of manipulation results in the window switchover from the high layer window into the low layer window being presently displayed. Furthermore, the repetitive uses of the above configuration enable a learning of the relation between each window switchover region and a correspondence image. Without need of recognizing or reading characters in the window switchover region, only recognizing of the correspondence image (e.g., color) enables a easy execution of a desired manipulation.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereinafter, a vehicular manipulation input apparatus according to an embodiment of the present invention is described with reference to the drawings.

Figure 1:
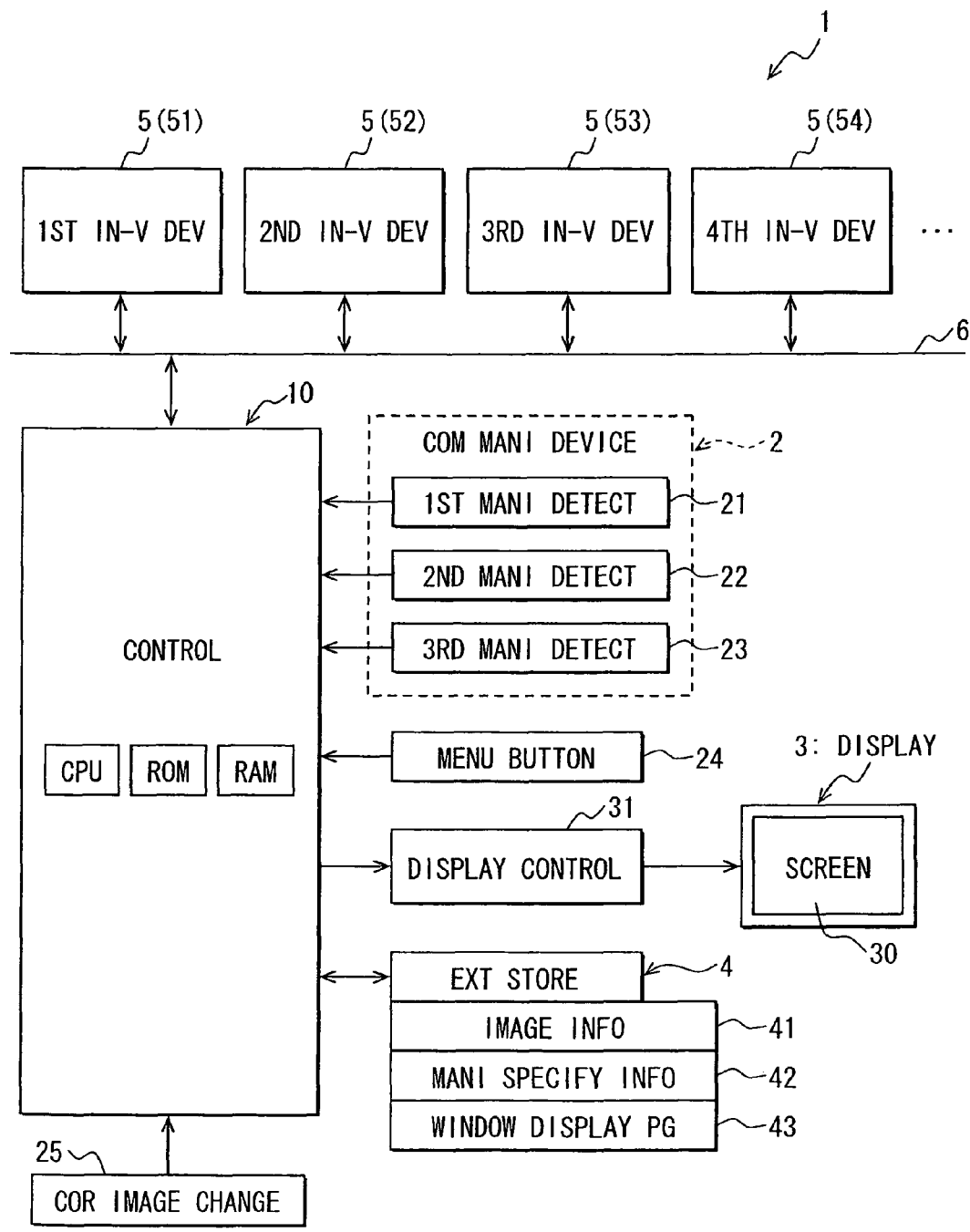
FIG. 1 is a block diagram illustrating a configuration of a vehicular manipulation input apparatus according to an embodiment of the present invention.

FIG. 1 is a block diagram illustrating a schematic configuration of a vehicular manipulation input apparatus according to an embodiment of the present invention. The vehicular manipulation input apparatus 1 is mounted in a subject vehicle. As shown in FIG. 1, the vehicle manipulation input apparatus 1 includes a display device 3, a control circuit 10, and a manipulation device 2. The display device 3, which may be referred to as a display means, has a screen 30 to display information or display windows. The control circuit 10, which may be referred to as a main display control means, displays a selection-use window 300 with several selection regions 3A (command switches) on the screen 30 of the display device 3 (see FIG. 2); and the manipulation device 2, which may be referred to as a selection manipulation means or device, enables a selection manipulation to select one of the several selection regions 3A in the displayed selection-use window 300.

The display device 3 can use, for instance, a well-known liquid crystal display to display a static image and a moving image. The display device 3 is connected with the control circuit 10 via a display control circuit 31. The display device 3 is driven according to a display-use driving signal outputted from the control circuit 10. In addition, the display device 3 is provided with various switches such as a menu switch 24, which are arranged in the circumference of the display screen 30. Those switches each are connected with the control circuit 10 via a signal input device (unshown), and input a manipulation signal into the control circuit 10 according to a manipulation. The menu switch 24 is a manipulation portion which performs a window switchover to switch a display window on the screen 30 of the display device 3 into a top menu window 302 according to a manipulation.

Figure 2:
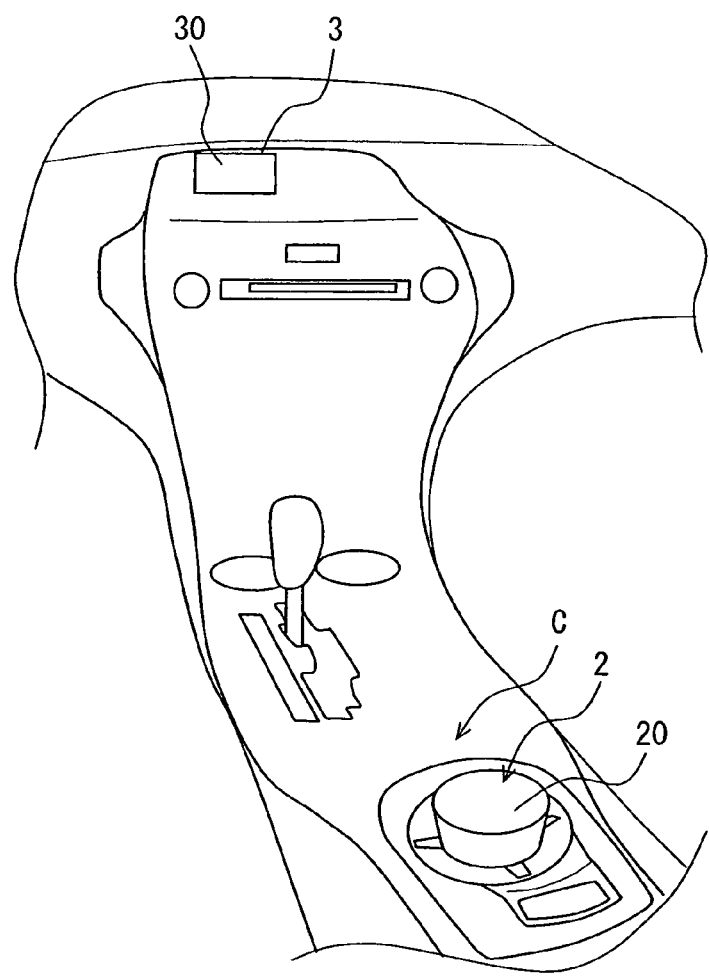
FIG. 2 is a perspective view of a vehicle compartment accommodating the manipulation input apparatus according to the present embodiment.
Figure 3:
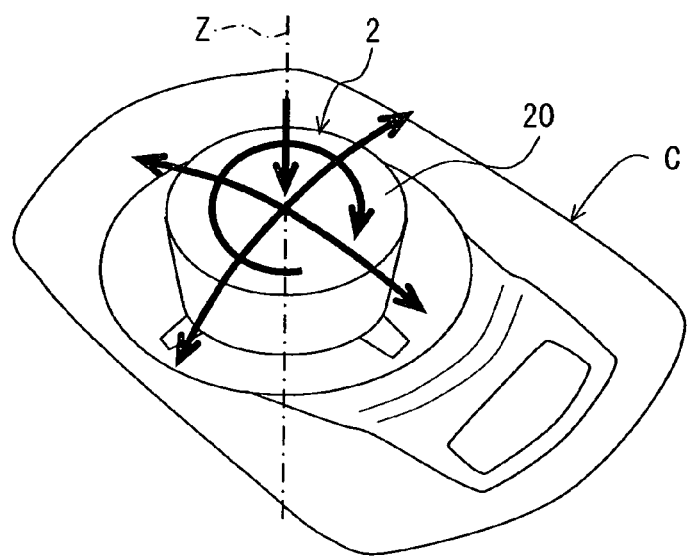
FIG. 3 is a diagram illustrating an example of a manipulation device in the manipulation input apparatus.
Figure 4A:
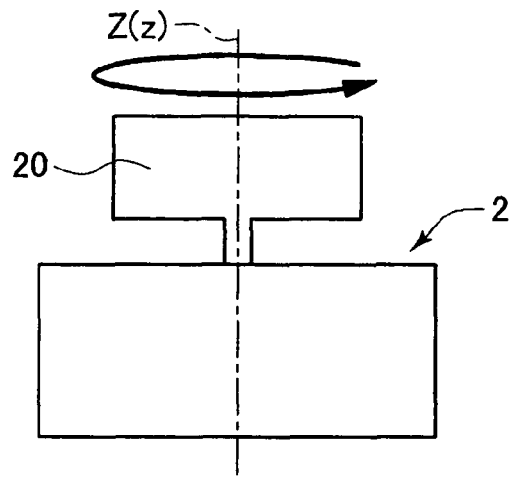
FIGS. 4A to 4C are diagrams which illustrate several manipulation modes enabled in the manipulation device of FIG. 3.
Figure 4B:
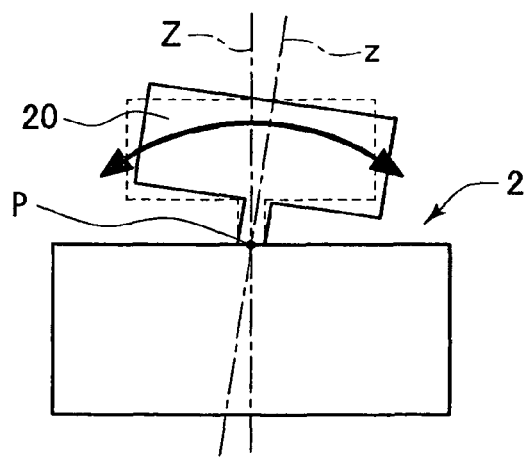
Figure 4C:
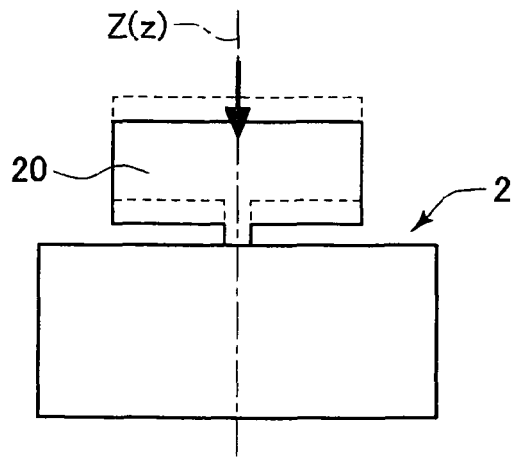

In the present embodiment, the manipulation device 2 is a composite manipulation device 2 which enables independently and selectively each of several selection manipulations due to several manipulation modes. With reference to FIG. 2, the composite manipulation device 2, which may be also referred to as a remote manipulation means or device, is arranged in a position separated from a position where the display screen 30 of the display device 3 is arranged for performing a remote manipulation input to the selection region 3A displayed on the display screen 30. In addition, this composite manipulation device 2 has or is assigned with several manipulation modes. For instance, the several manipulation modes define corresponding manipulations as being directed to mutually different manipulation directions. As illustrated in FIGS. 3A to 3C, the manipulation modes include three manipulation modes relative to a single manipulation knob 20 (i.e., handle), while the three manipulation modes have mutually different three manipulation directions. For instance, three modes are as follows: (i) a rotation manipulation mode in which the manipulation knob 20 is rotated around (or with respect to) a shaft axis z of the manipulation knob 20 itself (see FIG. 4A); (ii) a shift manipulation mode in which the manipulation knob 20 is shifted such that the shaft axis z is shifted orthogonally in a permitted shift direction, with a supporting point P centered, from a predetermined reference axis Z, which is identical to the shaft axis z that is arranged in a reference position, to thereby draw a circular arc or an angle between the reference axis Z and the shaft axis z (see FIG. 4B); and (iii) a press manipulation mode in which the manipulation knob 20 is pressed in line with the reference axis Z (also referred to as a push manipulation mode, see FIG. 4C).

It is noted that the manipulation knob 20 is designed to be guided such that the shift manipulation mode or shift manipulation is enabled to shift in any one of several previously permitted shift directions from a reference position. In the present embodiment, those permitted shift directions are four directions of a crisscross illustrated as four arrows being mutually orthogonal in FIG. 3. Thus, the shift manipulation may be provided with a crisscross direction manipulation (crisscross manipulation mode), in which the manipulation knob 20 can be moved or tilted in four crisscross directions with respect to the reference axis Z from the reference position. It is noted that the shift manipulation only needs to be designed such that the manipulation knob 20 moves in a direction orthogonal to the reference axis Z in a top-view in which the reference axis Z is seen as a center point. Thus, the shift manipulation may be designed such that the manipulation knob 20 is moved in a state that the shaft axis z is in parallel with the reference axis Z. Further, the shift manipulation may be a tilt manipulation of the whole of the manipulation knob 20 such that the shaft axis z is tilted from a predetermined reference position orthogonally to the reference axis Z on the basis of the supporting point P.

According to the present embodiment, the composite manipulation device 2 is a crisscross manipulation device which is designed so as to move in four directions including the front-and-back directions and right-and-left directions of the vehicle. Out of those manipulation directions, the vehicular front-and-back directions correspond to up-and-down directions in the display screen 30 of the display device 3, respectively, whereas the vehicular left-and-right directions correspond to the left-and-right directions of the vehicle in the display screen 30 of the display device 3, respectively.

The composite manipulation device 2 enables the manipulation knob 20 to be held in the reference position (i.e., neutral position) under a non-manipulation state. The composite manipulation device 2 is thereby provided with a biasing means such as a spring member, and a reactive force means such as a reactive force motor. In a casing of the manipulation device 2, several manipulation detection portions 21 to 23 are provided to detect manipulations of the various manipulation modes with respect to the manipulation knob 20. A first one is a rotation manipulation detection portion 21, which detects electrically a rotation manipulation amount based on the rotation manipulation with respect to the manipulation knob 20. A second one is a shift manipulation detection portion 22 which detects a shift manipulation with respect to the manipulation knob 20. A third one is a press manipulation detection portion 23 which detects a press manipulation with respect to the manipulation knob 20. Those manipulation detection portions 21 to 23 are connected respectively with the control circuit 10 via a signal input device (unshown), and input manipulation signals according to respective manipulations into the control circuit 10.

It is noted that the composite manipulation device 2 which can execute several manipulation modes using the single manipulation knob 20 is a well-known technology, as described in JP-2009-176432 and JP-2009-064638; thus, the explanation of the detail internal structure of the manipulation knob 20 is omitted.

The control circuit 10 includes mainly a known microcomputer which has a CPU, a ROM, a RAM, etc. The control circuit 10 executes various controls by the CPU executing programs stored in a storage device such as the ROM, and an external storage device 4. In addition, the control circuit 10 is connected via an in-vehicle LAN 6 to control circuits of other in-vehicle apparatuses 5, and able to exchange data or control signals with them.

In addition, the control circuit 10 functions as a control execution means or device to execute corresponding control, based on the control input signal received from the manipulation detection portions 21 to 23. For example, the various functions of a navigation apparatus 51, air-conditioning apparatus 52, car audio 53, and another in-vehicle apparatus 54, which are connected via the in-vehicle LAN 6, can be executed according to a manipulation applied to the composite manipulation device 2.

The external storage device 4 connected to the control circuit 10 is provided with an image information storage device 41 which stores image information for displaying various display windows. The control circuit 10 reads the image information at a necessary time and displays an image prepared based on the read data on the display screen 30 of the display device 3. The image information storage device 41 stores image information for each of several display windows that can be displayed. For example, the image information for displaying the above-mentioned selection-use window 300 contains background image information for displaying background images, input image information for superimposing several input images on the background image, auxiliary image information for displaying auxiliary images to be mentioned later, and correspondence image information for displaying various correspondence images to be mentioned later.

Further, the external storage device 4 includes a manipulation mode specification information storage device 42, which stores manipulation mode specification information with respect to each of several selection-use windows. The manipulation mode specification information can specify a manipulation mode for a selection manipulation, the manipulation mode which is available in the composite manipulation device 2 when the selection-use window 300 is displayed based on the above image information.

Further, when the selection-use window 300 is displayed on the display screen 30 of the display device 3, the control circuit 10 superimposes the input images 3C on several regions that are arranged in regions that are predetermined within the background image 3B corresponding to the whole area of the display screen 30 while causing the regions, where the input images 3C are displayed in superimposition, to function as selection regions 3A. Then, one of the selection regions 3A (input images 3C) is selected by a manipulation of the composite manipulation device 2; a determination input manipulation is made to the selected selection region 3A (input image 3C). The control circuit 10 then executes a control corresponding to the selection region 3A (input image 3C).

It is noted that the selection manipulation to select a selection region 3A is a manipulation of moving a cursor to the selection region 3A. For instance, in the selection-use window 300 displayed in the display screen 30, the cursor transfers between adjoining selection regions 3A (input images 3C) so as to move to the side corresponding to the direction of a shift manipulation of the manipulation knob 20 one by one, thereby selecting the selection region 3A alternatively. The cursor according to the present embodiment is expressed by performing an enlargement display of the selected selection region. In addition, the determination input may be executed simultaneously when the selection by the selection manipulation is made. Alternatively, the determination input may be executed when another different determination input manipulation is executed under the state where the selection region 3A has been selected by the selection manipulation. Under the present embodiment, the selection manipulation is assigned to or defined as either the rotation manipulation or shift manipulation according to the selection-use window 300. The determination input or manipulation is assigned to or defined as the press manipulation.

Further, in the present embodiment, in order to enable an association with a manipulation mode of the composite manipulation device 2 for selecting each selection region 3A (input image 3C) on the selection-use window 300, or a manipulation mode responding or corresponding to the selection-use window 300, an auxiliary image 3D is displayed by the control circuit 10 so as to reflect a manipulation movement locus in the corresponding manipulation mode of the composite manipulation device 2 in superimposition on the above background image 3B. When the selection-use window 300 is thus displayed, it can be determined by the auxiliary image 3D which manipulation mode of the composite manipulation device 2 is used for the selection manipulation.

The following explains a manipulation window display process executed by the control circuit 10. The control circuit 100 executes a window display program 43 stored in the external storage device 4. When a window switchover request signal is inputted from the composite manipulation device 2, other manipulation devices, external control circuit, or the like, the control circuit 10 reads the image information corresponding to the window, the display request of which was carried out based on the window switchover request signal, from the image information storage device 41, and executes a window display in the display device 3 based on the image information. In addition, when the window currently displayed is the selection-use window 300, several selection regions 3A exist in the displayed window. When one of these selection regions 3A is selected by the composite manipulation device 2 and the determination input is then carried out, the control circuit 10 executes a control corresponding to the selection region 3A to which the determination input is carried out. When the selection region 3A to which the determination input was carried out is or serves as a window switchover region 3a, a control is executed so as to switch the display or displayed window to a predetermined low layer window corresponding to the window switchover region 3a. Suppose a case that the point to which the display is switched is also a selection-use window 300, and the selection-use window 300 still contains a window switchover region 3a in the selection regions 3A. In such a case, when the selection region 3A is selected by the composite manipulation device 2 and the determination input is then carried out, a predetermined window of a lower layer corresponding to the window switchover region 3a is displayed. In the present embodiment, window displays or window switchover based on such a hierarchical structure can be enabled.

However, in the window displays based on such a hierarchical structure, the increase of the number of hierarchical layers and the number of branches in each hierarchical layer (i.e., the number of window switchover regions 3a) may cause a manipulator or user to miss in which point or layer of the hierarchical structure the present display window is. In this case, even if the user intends to display a desired window, the user may not know any longer an efficient window switchover procedure for switching to the desired window from the present window. There are not few cases where it takes a time-consuming procedure more than needs to reach the desired window. To that end, in the present embodiment, a visual association is provided in between a selection-use window 300 previously displayed and a manipulation-use window 300, which is presently displayed and entered from the selection-use window 300, thereby solving the problem.

For instance, suppose a case where the display screen 30 displays a high layer window 300 that contains more than one window switchover region 3a and functions as a selection-use window associated with a low layer window. In such a case, the control circuit 10 displays a first correspondence image 3X. The first correspondence image 3X enables a corresponding window switchover region 3a existing in the high layer window 300 to be visually discerned, but also to have at least one of a color and a patterned design unique to the corresponding window switchover region 3a, thereby visually indicating a correspondence relation with the window switchover region 3a. When one of the window switchover regions 3a existing in the high layer window 300 is selected by the composite manipulation device 2 and the determination input is carried out to the selected window switchover region 3a, the control circuit 10 switches the display of the display screen 30 into the low layer window 300 corresponding to the window switchover region 3a to which the determination input was carried out while displaying in this low layer window 300 newly displayed a second correspondence image 3Y, which has a visual association with the first correspondence image 3X corresponding to the window switchover region 3a to which the determination input was carried out.

The above configuration provides the following display operation. In the high layer window 300, each first correspondence image 3X is displayed so as to define or indicate each window switchover region 3a. Then, a manipulation of selecting and determining one of the several window switchover regions 3a is performed, thereby displaying the corresponding low layer window 300. In the low layer window 300, the second correspondence image 3Y is displayed which has a visual association with the first correspondence image 3X, which is in the high layer window 300 while indicating the window switchover region 3a that was manipulated. Only seeing of this low layer window 300 enables the following: (i) the window switchover region 3a manipulated in the high layer window 300 may be imagined or associated easily, and (ii) what kind of manipulation switching from the high layer window 300 to the low layer window 300 presently displayed may be understood intuitively. Furthermore, by repeatedly undergoing such display operations, the association between window switchover regions 3a and correspondence images 3X may be memorized. When the high layer window 300 is displayed, without need to recognize characters or the like describing control contents in the window switchover regions 3a, only recognizing the correspondence image 3X corresponding to the window switchover regions 3a enables the execution of the selection manipulation to the desired window switchover region 3a.

It is noted that the visual association between the correspondence images signifies that two mutually corresponding images compared to each other have identical or approximate visual attributes in respect of either or both of a patterned design and a color.

Figure 23:
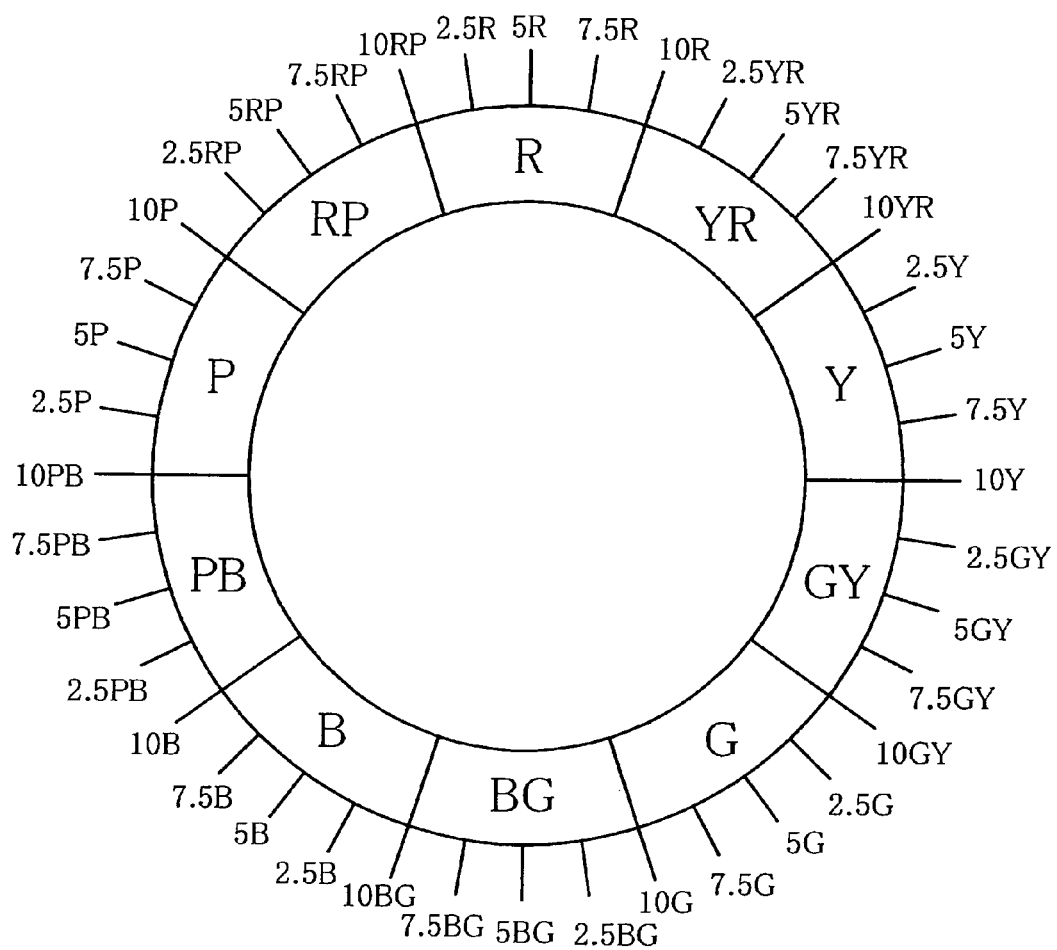
FIG. 23 is a diagram illustrating Hue Circle stipulated in "JIS Z 8721."

In addition, the approximation of the color signifies that a certain color is approximate, in hue, to a color serving as a reference. That a certain color is approximate in hue signifies that the certain color has a ratio of the hue perception difference on the hue circle stipulated in "JIS (Japanese Industrial Standard) Z 8721" illustrated in FIG. 23 within a predetermined (approximate) range ±10 from the color serving as a reference.

It is noted that the design pattern may be defined as a pattern graphic which appears regularly such as a picture or graphical shape, without including a character string, or variations in color or size.

The color or patterned design unique to a predetermined region signifies that there is a difference from that of a different region other than the predetermined region. In particular, the color unique to the predetermined region is not even approximate to that of the different region other than the predetermined region.

The following explains a display example of a window displayed on the display screen 30 of the display device 3 according to the present embodiment with reference to FIGS. 5 to 12.

Furthermore, the drawings indicating window examples contain patterned designs such as hatching within each region, providing a visual difference between regions. Without need to be limited to such patterned designs, as long as regions are drawn or designed so as to have a difference from each other in a visual attribute, the difference may be provided by a color instead of a patterned design or by not only a patterned design but also a color.

Figure 5:
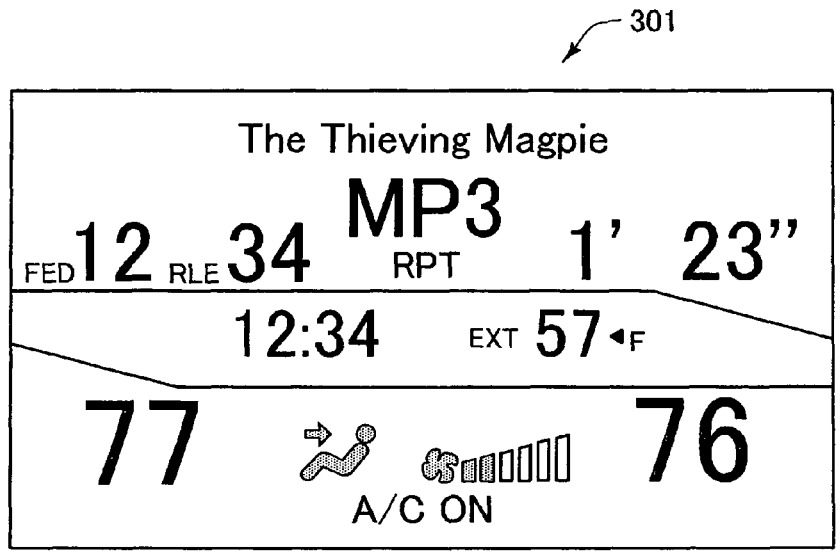
FIG. 5 is a diagram of a display window example of a present-status window which is displayed in the manipulation input apparatus.

For example, FIG. 5 shows a present status display window 301 which displays vehicle information such as a present control status and present detection information of the various in-vehicle apparatuses 5. In FIG. 5, the reproduction information of the audio, the setup information of the air-conditioner, the time clock of the clock, etc. are displayed. In cases that the menu switch 24 is manipulated in this status, i.e., while the present status display window 301 is displayed, a display window is switched from the present status display window 301 into a top menu window 302 shown in FIG. 6.

Figure 6:
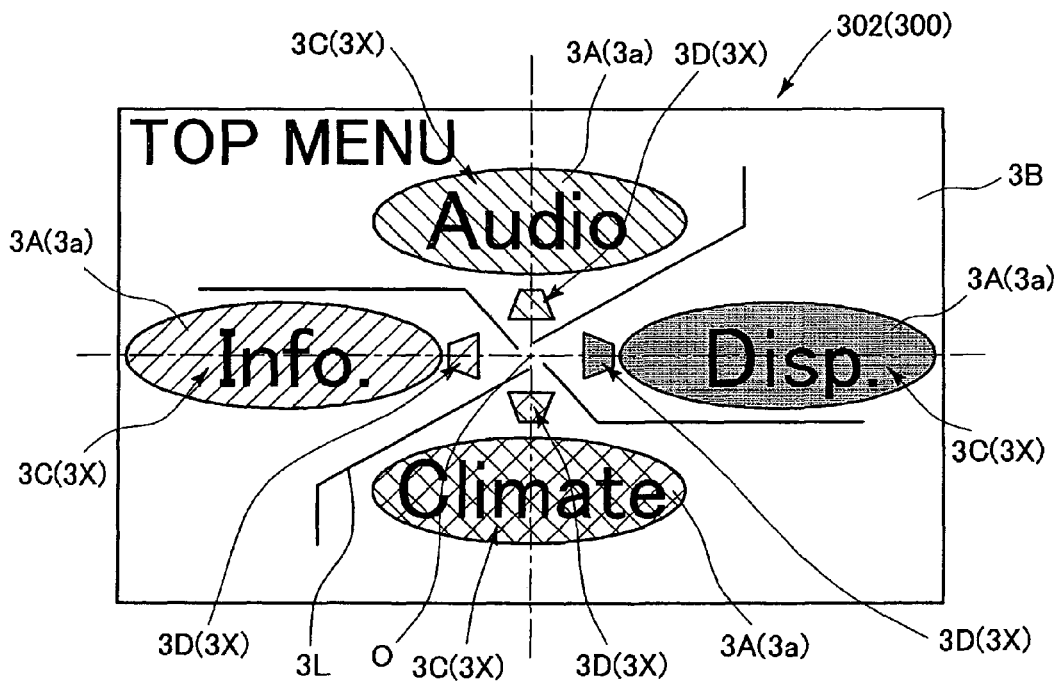
FIG. 6 is a diagram of a first display window example of a selection-use window which is displayed in the manipulation input apparatus.

The top menu window 302 of FIG. 6 is a selection-use window 300 in which several selection regions 3A are arranged with predetermined intervals along a circle centering on a window reference point O on the display screen 30. Further, the selection regions 3A are arranged in a crisscross form (i.e., on the left, right, upper, and lower side with the predetermined window reference point O centered in the display screen 30. It is noted that in FIG. 6, the cursor which is expressed by performing an enlargement display for a selection region 3A being selected is currently in non-selection state where any of the selection regions 3A is not selected, while the composite manipulation device 2 is maintained at a neutral position.

The top menu window 302 is a window (high layer window) of the highest layer in the hierarchical structure contains at least one window switchover region 3a in several selection regions 3A. A first correspondence image 3X having at least one of a color or a patterned design unique to each window switchover region 3a is displayed as an image visually indicating a correspondence relation with each window switchover region 3a. The first correspondence images 3X are images having (i) colors not appropriate to each other or (ii) patterned designs different from each other, thereby providing a clear difference in a visual characteristic or attribute from each other. For instance, the background image 3B is black; the letter symbol etc. are white (reverse may be acceptable). The selection regions 3A are provided with mutually different colors, each of which is different from those of the background and the letter symbol. The mutually different colors of the selection regions 3A in the present embodiment signify even being not appropriate to each other. Furthermore, a color assigned to each selection region 3A is defined to be associated with the control content and control kind corresponding to each selection region 3A. For instance, "Climate" is assigned with a color of "green" expressing "comfortable"; and "Audio" is assigned with a color of "orange (warm color group)" expressing "pleasant". Such colors are provided with the brightness and chroma saturation which can take contrast against the characters. Further, in the present embodiment, those colors are provided as colors of which the brightness and chroma saturation may be thinned or reduced a little, easing the burden of the user's eyes.

Now, one of the window switchover regions 3a in the top menu window 302 is selected by the manipulation of the composite manipulation device 2; the determination input is then carried out. Upon receiving the input, the control circuit 10 switches the display or displayed window from the top menu window 302 currently displayed on the display screen 30 into one of the low layer windows 303 to 306 corresponding to the window switchover region 3a to which the determination input was carried out. In the top menu window 302 of FIG. 6, each of all the selection regions 3A arranged on the left, right, upper, and lower sides is a window switchover region 3a. Further, when the window switchover region 3a on the upper side in FIG. 6 is selected and receives a determination input, the display is switched into the window 303 of FIG. 7 which is a corresponding low layer window. When the window switchover region 3a on the right side in FIG. 6 is selected and receives a determination input, the display is switched into the window 304 of FIG. 10 which is a corresponding low layer window. When the window switchover region 3a on the left side in FIG. 6 is selected and receives a determination input, the display is switched into the window 305 of FIG. 11 which is a corresponding low layer window. When the window switchover region 3a on the lower side in FIG. 6 is selected and receives a determination input, the display is switched into the window 306 of FIG. 12 which is a corresponding low layer window. In this case, in the low layer window 303-306 into which the display is switched, the second correspondence image 3Y is displayed which has a visual association, in respect of either or both the color and the patterned design, with the first correspondence image 3X corresponding to the window switchover region 3a to which the determination input was made.

It is noted that the first correspondence image 3X in FIG. 6 is an image (corresponding color image) which contains a color unique to the corresponding window switchover region 3a. In this display window example, the first correspondence image 3X is an input image 3C currently displayed on the corresponding window switchover region 3a. The whole of an image area of the input image 3C is smeared away with the color unique to the corresponding window switchover region 3a. The input images 3C are smeared away respectively by the colors which are not approximate to one another. Although the first correspondence image 3X may be assigned only to the input image 3C, the first correspondence image 3X may be assigned also to the auxiliary image 3D.

The following explains (i) the low layer windows 303 to 306 into which the displayed window can be switched from the top menu window 302, and (ii) windows of layers in the hierarchical structure further lower than the low layer window.

Figure 7:
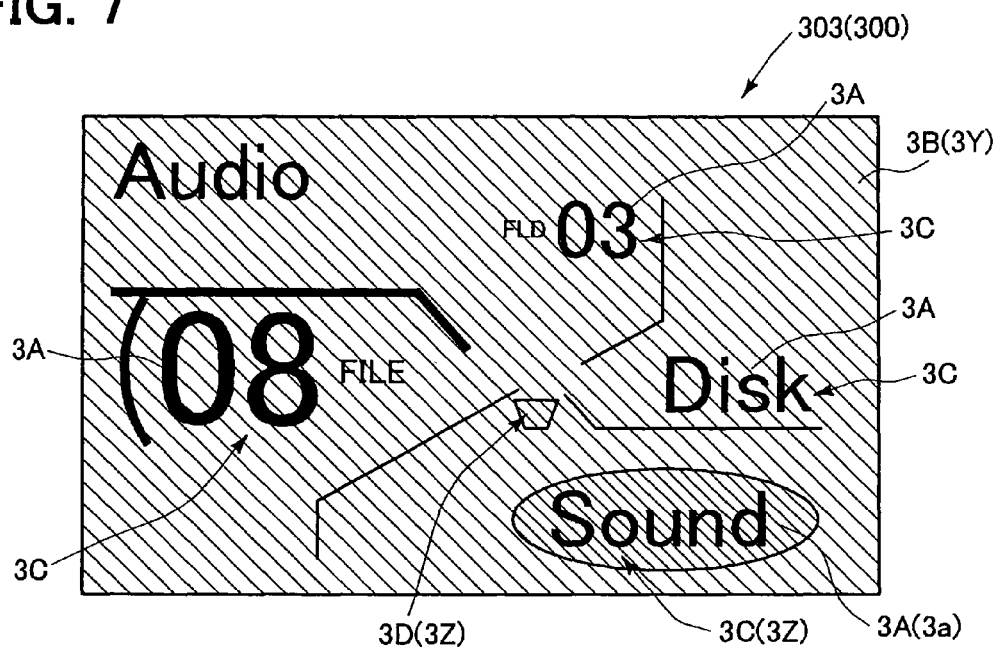
FIG. 7 is a diagram of a display window example of a low layer window which is branched from FIG. 6.

The window 303 of FIG. 7 is a low layer window which is associated with the top menu window 302 of FIG. 6 serving as a high layer in the hierarchical structure. The window 303 is a selection-use window 300 containing, like the top menu window 302, several selection regions 3A, within which at least one window switchover region 3a is included. It is noted that in FIG. 7, the cursor, which is expressed by performing an enlargement display of a selection region 3A being selected, selects the selection region 3A arranged on the left side in FIG. 7. This window indicates the state appearing after executing a shift manipulation of the composite manipulation device 2 towards the left side.

In the window 303 of FIG. 7, a second correspondence image 3Y (second corresponding color image) is displayed which has a color, color hue, chroma saturation, and brightness identical to those of the first correspondence image 3X corresponding to the window switchover region 3a to which the determination input was made in the high layer window 302 having appeared prior to the switchover into the window 303 of FIG. 7. The second correspondence image 3Y in this display example is a background image 3B of the window 303. The background image 3B is in the state where the background is smeared away with the same color as that of the window switchover region 3a (input image 3C) to which the determination input was carried out in the window 302. Thereby, the association between (i) the manipulation in the high layer window 302 and (ii) the low layer window 303 presently displayed can be intuitively understood using the color.

In addition, in the window 303 of FIG. 7, a third correspondence image 3Z is displayed as an image indicating visually the correspondence relation with the window switchover region 3a. The third correspondence image 3Z is provided as an input image 3C (along with an auxiliary image 3D) currently displayed on the corresponding window switchover region 3a. Moreover, the whole of an imaging region of the input image 3C is an image (third corresponding color image) smeared away by the color, which is unique to the corresponding window switchover region 3a and different but approximate to the hue of the color of the second correspondence image 3Y. The third correspondence image 3Z is superimposed on the second correspondence image 3Y serving as a background image. That is, in the low layer window 303 of FIG. 7, the second correspondence image 3Y (background image) and the third correspondence image 3Z (superimposition image) are displayed by the colors which are approximate to each other in the hue and visually discernible from each other.

In the state where the low layer window 303 is displayed in FIG. 7, one of the window switchover regions 3a in this window 303 is selected by the manipulation of the composite manipulation device 2 and the determination input is carried out. Upon receiving the determination input, the control circuit 10 switches the display from the high layer window presently displayed in the display screen 30 into the low layer window that is one-layer lower than the present high layer window. In the case of FIG. 7, there is only one window switchover region 3a in the bottom of the window 303. When the only one window switchover region 3a is selected and receives a determination input, the control circuit 10 switches the display in the display screen 30 into the corresponding low layer window that is a window 307 in FIG. 8.

Figure 8:
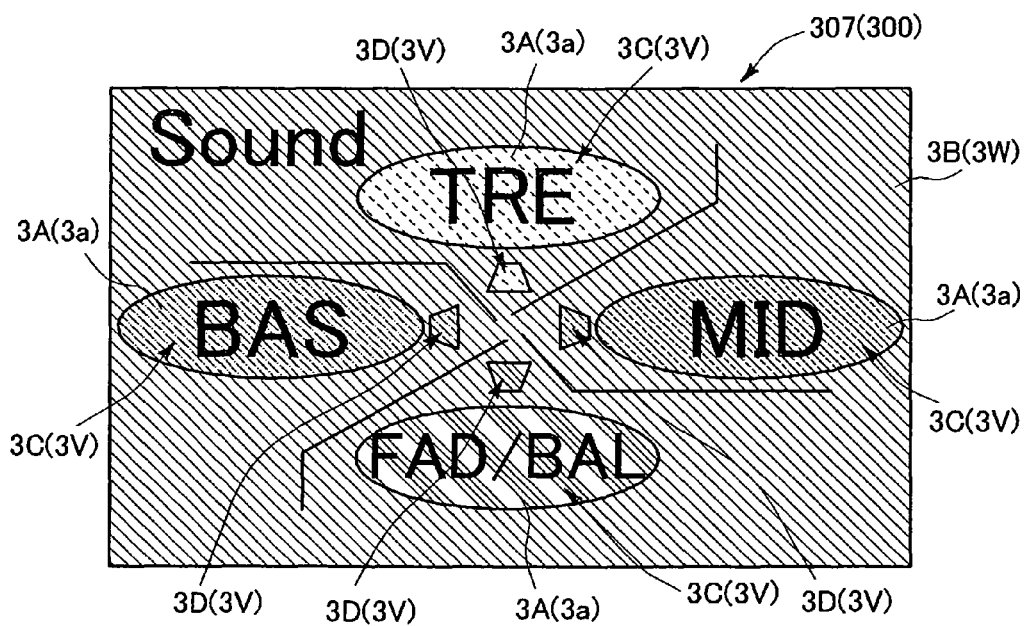
FIG. 8 is a diagram of a display window example of a low layer window which is branched from FIG. 7.

The window 307 of FIG. 8 is a low layer window which is associated with the window 303 of FIG. 7 serving as a high layer window in this case. The window 307 is a selection-use window 300 containing, like the window 303, several selection regions 3A, within which at least one window switchover regions 3a is included. It is noted that in FIG. 8, the cursor which is expressed by performing an enlargement display of a selection region 3A being selected is in non-selection state where any of the selection regions 3A is not selected, while the composite manipulation device 2 is maintained at a neutral position without selecting each selection region 3A.

In the window 307 of FIG. 8, a fourth correspondence image 3W (second corresponding image) is displayed which has the same color, color hue, chroma saturation, and brightness identical to those of the third corresponding image 3X (first corresponding image) corresponding to the window switchover region 3a to which the determination input was made in the higher layer window 303 having appeared before switching into the window 307 of FIG. 8. The fourth correspondence image 3W in this display window example is or serves as a background image of the window 307. The background image is in the state where the background is smeared away with the same color as that of the window switchover region 3a to which the determination input was carried out in the window 303.

In addition, the window 307 of FIG. 8 contains a fifth correspondence image 3V corresponding to each window switchover region 3a. The fifth correspondence image (i.e., the third correspondence image) enables the corresponding window switchover region 3a to be discernible from other window switchover regions 3a while indicating a correspondence relation with the corresponding window switchover region 3a. The fifth correspondence image 3V is and serves as an input image 3C (along with an auxiliary image 3D) currently displayed on the corresponding window switchover region 3a. Moreover, the whole of an imaging region of the input image 3C is an image smeared away by the color, which is unique to the corresponding window switchover region 3a and different but approximate to the hue of the color of the fourth correspondence image 3W (second correspondence image). The fifth correspondence image 3V is superimposed on the fourth correspondence image 3W serving as a background image.

In the state where the low layer window 307 is displayed in FIG. 8, one of the window switchover regions 3a in this window 307 is selected by the manipulation of the composite manipulation device 2 and the determination input is carried out. Upon receiving the determination input, the control circuit 10 switches the display from the window 307 presently displayed in the display screen 30 into a low layer window that is one-layer lower than the present window. In the case of FIG. 8, in the window 303, the window switchover region 3a exists on the four sides or directions of the window, respectively. When one of the window switchover regions 3a is selected and receives a determination input, the control circuit 10 switches the display in the display screen 30 into a window of a hierarchical layer lower than that of the window 303.

With respect to a series of window displays or window switchovers based on the hierarchical structure in FIG. 6 to FIG. 8, the window switchover from FIG. 6 to FIG. 7, and the window switchover from FIG. 7 to FIG. 8 use a comparable window switchover manner. That is, the hierarchical order between the window 307 of FIG. 8 and the window 303 of FIG. 7 is comparable with the hierarchical order between the window 303 of FIG. 7 and the window 302 of FIG. 6. The fifth correspondence image 3V in the window 307 of FIG. 8 is regarded as the third correspondence image; the fourth correspondence image 3W in the window 307 of FIG. 8 is regarded as the second correspondence image; and, furthermore, the third correspondence image 3Z in the window 303 of FIG. 7 is regarded as the first correspondence image. In this case, the window switchover from FIG. 7 into FIG. 8 is similar to the window switchover from FIG. 6 to FIG. 7. Therefore, if the hierarchical structure is provided repeatedly further below the window 307 of FIG. 8, the switchover of the windows based on such a technique is sequentially executed as the hierarchical order descends.

The following is relative to the relation of the two adjoining hierarchical layers of a high layer window and a low layer window that can be transferred directly from the window switchover region 3a of the high layer window. The correspondence image which indicates visually the correspondence relation with the window switchover region 3a in the high layer window is defined as the first correspondence image. Furthermore, the correspondence image, which is displayed in the low layer window and has a visual association with the first correspondence image corresponding to the window switchover region 3a to which the determination input was carried out in the high layer window, is defined as the second correspondence image. The correspondence image, which is also displayed in the low layer window and indicates visually the correspondence relation with the window switchover region 3a displayed in the low layer window is defined as the third correspondence image. Therefore, in the relation between the window 303 of FIG. 7 and the window 307 of FIG. 8, the third correspondence image 3Z of FIG. 7 is the first correspondence image; the fourth correspondence image 3W of FIG. 8 is regarded as the second correspondence image; and the fifth correspondence image 3V of FIG. 8 is regarded as the third correspondence image.

In the present embodiment, the window 307 of FIG. 8 contains one or more window switchover regions 3a which enables the transfer or switchover to a lower hierarchical layer. In the window of the further lower hierarchical layer, like the window switchover from FIG. 6 to FIG. 7, the correspondence image (i.e., the second correspondence image) is displayed which has a visual association with the correspondence image (i.e., the first correspondence image) corresponding to the window switchover region 3a to which the determination input is carried out in the window 307 of FIG. 8. In addition, if the window of the lower hierarchical layer than the window 307 of FIG. 8 contains a window switchover region 3a which switches the display into a further lower hierarchical layer window, the correspondence image (i.e., the third correspondence image) corresponding to each window switchover region 3a is displayed as an image which indicates visually the correspondence relation with the window switchover region 3a. On the contrary, if the window of the lower hierarchical layer than the window 307 of FIG. 8 does not contain a window switchover region 3a which switches the display into a lower hierarchical layer window, the window is regarded as a lowest hierarchical layer window. In this case, the lowest hierarchical layer window may contain the second correspondence image, but does not contain the third correspondence image.

Thus, the window display based on the hierarchical structure in the present embodiment is provided as follows. When one or more window switchover regions 3a exist in the window presently displayed, the first correspondence image 3X (3Z) is displayed which indicates visually the correspondence relation with each window switchover region 3a.

In other words, each window switchover region 3a is presented or drawn using the first correspondence image 3X (3Z).

When a determination input is made to one of the window switchover regions 3a and the following window thus appears, in the following window, the second correspondence image 3Y (3W) is displayed which has a visual association with the previous first correspondence image 3X, thereby making clear the association of both the windows. When one or more window switchover regions 3a exist in the following window, the third correspondence image 3Z (3V) corresponding to the window switchover region 3a is displayed along with the second correspondence image 3Y(3W). The third correspondence image 3Z is an image which has a visual association with the second correspondence image 3Y (3W) but different from the second correspondence image 3Y (3W). Such a switchover or transfer to a next one-layer lower window is thus repeatedly executed in the hierarchical structure.

In FIG. 7, out of the selection regions 3A, remaining selection regions 3A not serving as a window switchover region 3a can receive an amendment manipulation for amending a control parameter corresponding to each region 3A. In the window 303 of FIG. 7, the shift manipulation is assigned to the selection manipulation. When the rotation manipulation is made in the state where one of the remaining selection regions 3A is selected, the control is executed which amends the control parameter corresponding to the selected selection region 3A according to the manipulation amount of the rotation manipulation. For example, suppose that the window 303 of FIG. 7 is in the state where the selection region 3A for changing music data files is selected. In such a case, when the rotation manipulation is made, a file signified 08 of the music data file stored in the folder 03 of a predetermined memory medium (Disk) can be changed to another file in the folder 03 according to a predetermined order.

Figure 9:
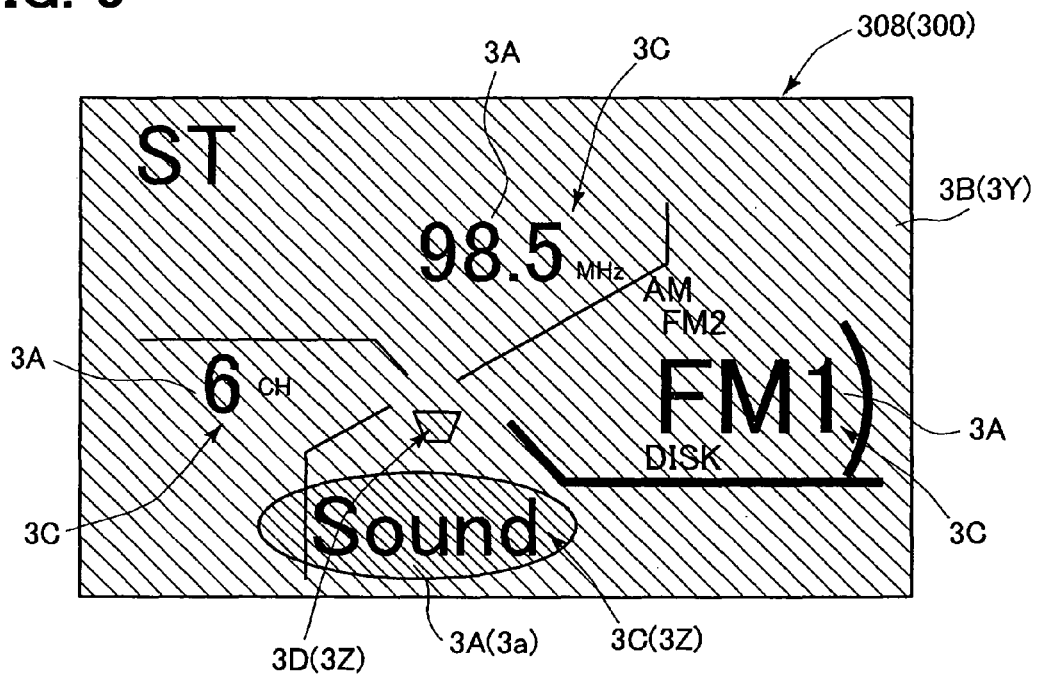
FIG. 9 is a diagram illustrating a display window example which appears when a selection state is switched in the low layer window of FIG. 6.

Although the window 308 of FIG. 9 is the same selection-use window 300 as the window 303 of FIG. 7, the selected selection region 3A is different so that the content of drawing of each selection region 3A is different. However, the same content of drawing is assigned to the selection region 3A serving as the window switchover region 3a on the lower side in the window. Thus, even if the window display is differentiated in the same selection-use window 300 by the selection state, the display of the selection region 3A functioning as the window switchover region 3a is not amended.

In the window 308 of FIG. 9, the reproduction target is changed. Although the stored data in a memory medium (Disk) is selected as the reproduction target in FIG. 7, FM1 is selected as the reproduction target in FIG. 9. The switchover of the selective state relative to the selection region 3A is made by the shift manipulation; the changeover of the control parameter under selection is made by the rotation manipulation. It is noted that FIG. 9 illustrates the state after the shift manipulation of the composite manipulation device 2 was carried out towards the right side, and the cursor selects the selection region 3A on the right side of the screen 30.

Figure 10:
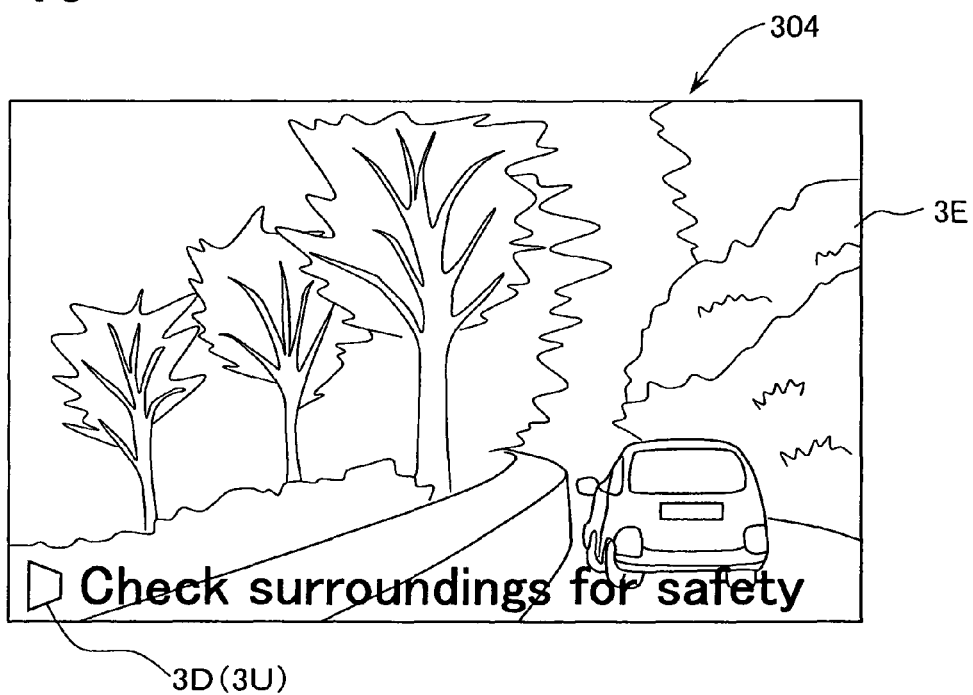
FIG. 10 is a diagram illustrating a display window example of another low layer window, which is branched from FIG. 6 while being different from that of FIG. 7.

The window 304 of FIG. 10 displays a driver assistance image 3E captured with an in-vehicle camera (unshown), instead of a selection-use window 300. Therefore, the window 304, which does not contain any selection region 3A, is a lowest layer window that is defined as not being linked with a lower layer window. However, a correspondence image 3U (i.e., the second correspondence image 3Y) is contained which has a visual association with the correspondence image 3X (i.e., the first correspondence image), which corresponds to the window switchover region 3a to which a determination input is made in the top menu window 302 in order to switch into the window 304. The correspondence image 3C and the correspondence image 3E are identical in respect of not only color, patterned design, and contour shape, but also a size and direction. In addition, the correspondence image 3U (second correspondence image) is an auxiliary image 3D which illustrates a manipulation direction reflecting a manipulation movement locus of the composite manipulation device 2 for selecting the window switchover region 3a to switch into the window 304.

In the lowest layer window, as shown in FIG. 10, when displaying the one static image or the moving image using the whole window, the display of the second correspondence image may be omitted. In addition, the color of the correspondence image (i.e., the first correspondence image) corresponding to the window switchover region 3a to which the determination input was carried out in order to change the window to the lowest layer window is preferably white or black.

Figure 11:
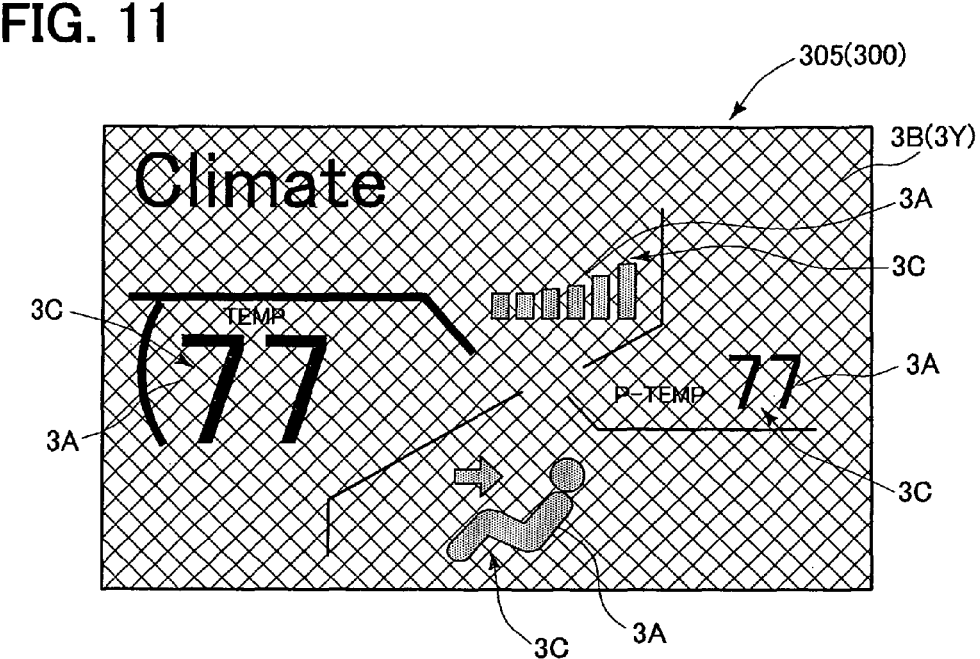
FIG. 11 is a diagram illustrating a display window example of another low layer window, which is branched from FIG. 6 while being different from that of FIG. 7 or FIG. 10.

The window 305 of FIG. 11 is a selection-use window 300 which has several selection regions 3A. The several selection regions 3A does not include a window switchover region 3a; thus, the window 305 is a lowest layer window. In the window 305 of FIG. 11, one of the selection regions 3A can become in a selected state by the shift manipulation. In the selected state, a control parameter corresponding to the selected selection region 3A is amended according to a rotation amount of the rotation manipulation. The window of FIG. 11 indicates the state appearing after executing a shift manipulation of the composite manipulation device 2 towards the left side. The cursor selects the selection region 3A on the left side in the window.

Figure 12:
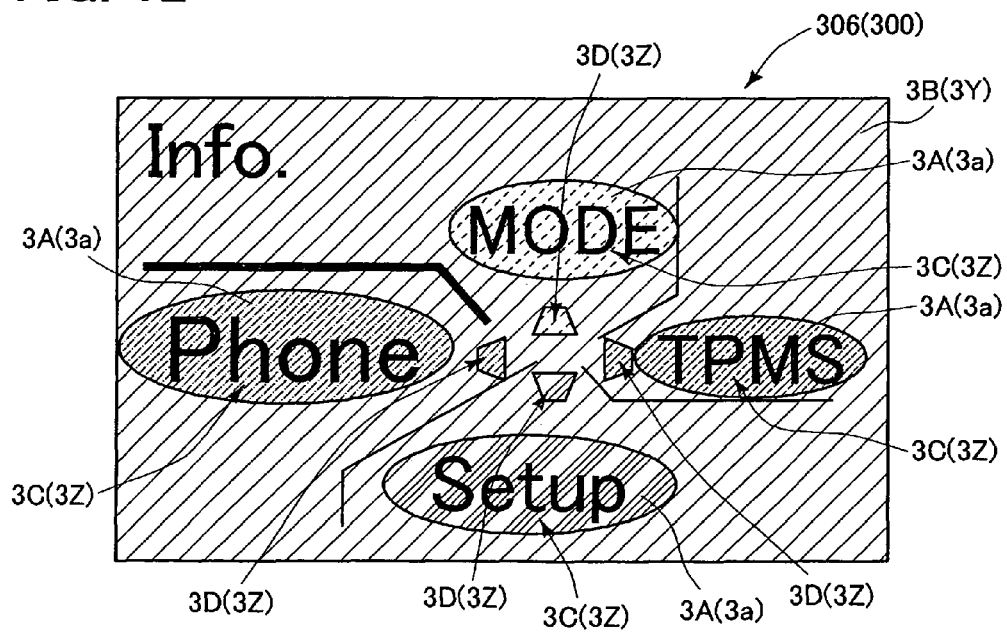
FIG. 12 is a diagram illustrating a display window example of another low layer window, which is branched from FIG. 6 while being different from that of FIG. 7, FIG. 10, or FIG. 11.

The window 306 of FIG. 12 is a selection-use window 300 which has several selection regions 3A, each of which serves as a window switchover region 3a. When determination inputs are made to the window switchover regions 3a, respectively, like the window 302, 307 of FIGS. 6, 8, the window 306 can be changed into four kinds of the low layer windows. In the window 306 of FIG. 12, a correspondence image unique to each window switchover region 3a is displayed as an image indicating visually the correspondence relation with the window switchover region 3a. When a determination input is made to one of the window switchover regions, a correspondence image, which has a visual association with the one of the window switchover regions, is displayed in the window into which the display is switched. It is noted that FIG. 12 illustrates the state after the shift manipulation of the composite manipulation device 2 was carried out to the left side, and the cursor selects the selection region 3A on the left side of the screen 30.

In the selection-use window 300 in the present embodiment, the selection regions 3A are accompanied by display highlight portions 3L (see line images in FIG. 6), respectively. The display highlight portions 3L are arranged to associate with a rotation of a windmill whose circle centers on the display reference point O, in superimposition on the background image. In this regard, however, the selection manipulation is made not by the rotation manipulation but by the shift manipulation in this display window example. In order to illustrate the necessity of the shift manipulation, an auxiliary image 3D is displayed which reflects the manipulation movement locus of the manipulation mode of the composite manipulation device 2 corresponding to the displayed selection-use window 300.

In the present embodiment, the composite manipulation device 2 is arranged at a position closer to a predetermined seat as an auxiliary manipulation portion so as to relieve the user from a manipulating load as compared with the main manipulation portions such as a touch panel on the screen 30 or mechanical switch arranged close to the screen 30. As illustrated in FIG. 2, the composite manipulation device 2 is arranged in a position, which can be reached by users who are seated in vehicular seats while leaning on backrests of the seats. For instance, the composite manipulation device 2 is arranged in a region C (herein, a center console) intervening between a vehicular right seat and a vehicular left seat (i.e., the drivers seat and the passenger seat) of the vehicle. In contrast, compared with position of the composite manipulation device 2, the display device 3 is arranged in a position closer to the front of the vehicle so as to enable the users seated in the respective seats to see.

The example of the present embodiment is explained in the above; however, such an example is only one example. The present embodiment need not be limited to the above example, and can be varied in various manners based on the knowledge of a person skilled in the art unless deviating from the scope of the claims. (Other embodiments)The following describes another embodiment.

For instance, in the above embodiment, the second correspondence image accords with the associated first correspondence image in respect of color. Without need to be limited thereto, as long as the color of the second correspondence image may have a color hue identical or approximate to that of the color of the associated first correspondence image, the chroma saturation and brightness can be different. In addition, the third correspondence image drawn by the color approximate to that of the second correspondence image may have a color different from the color of the second correspondence image while having a color hue approximate to that of the second correspondence image. Further, the third correspondence image may have a color hue identical to that of the second correspondence image with the chroma saturation and brightness differentiated.

Further, in the above embodiment, the association between a high layer window and a low layer window is expressed by colors of the first correspondence image and the second correspondence image. Instead of the colors, patterned designs may be used for expressing. That is, in the above embodiment, the visual attribute used for indicating the association in FIGS. 6 to 12 is defined as a color; however, the visual attribute may be defined as a patterned design or a combination of a color and patterned design. It is noted that the patterned design may be defined as a graphic pattern which appears regularly such as a picture or graphic shape, excluding a character string, or variations in color or size. That is, an identical patterned design may be defined as an image where a graphic appears repeatedly in an identical pattern within a region such as hatching. If the comparative images are different from each other in color or region size, but identical in drawing pattern of a graphic within each region, it may be defined that the comparative images each have an identical patterned design.

Figure 13:
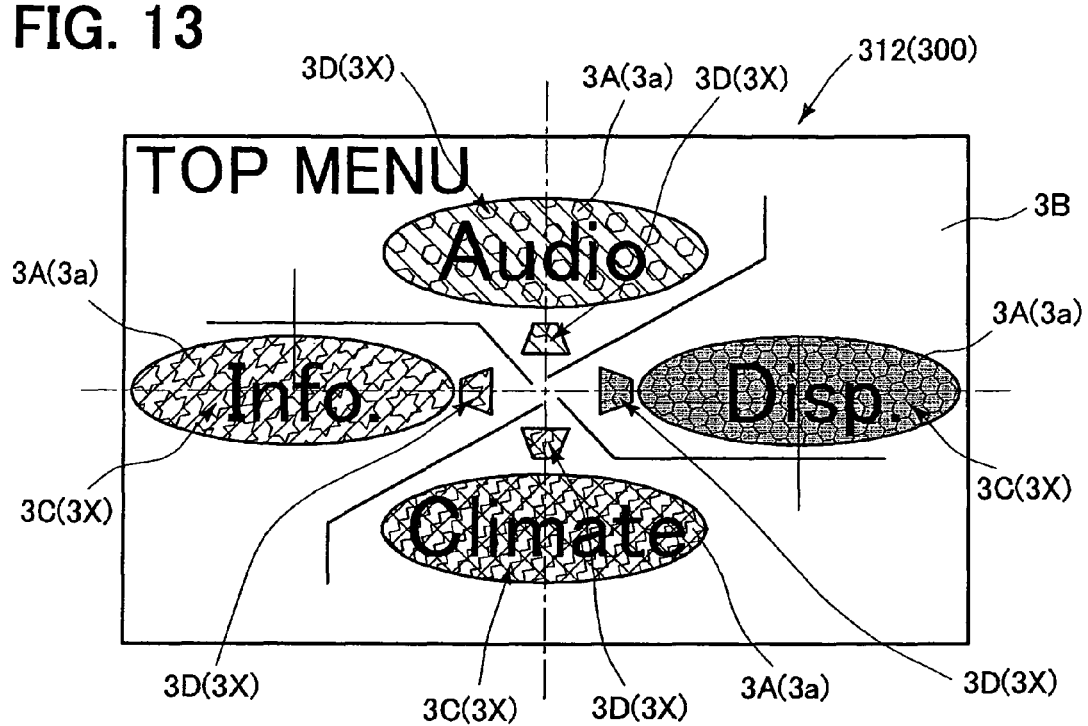
FIG. 13 is a diagram of a second display window example of a selection-use window which is displayed in the manipulation input apparatus.
Figure 14:
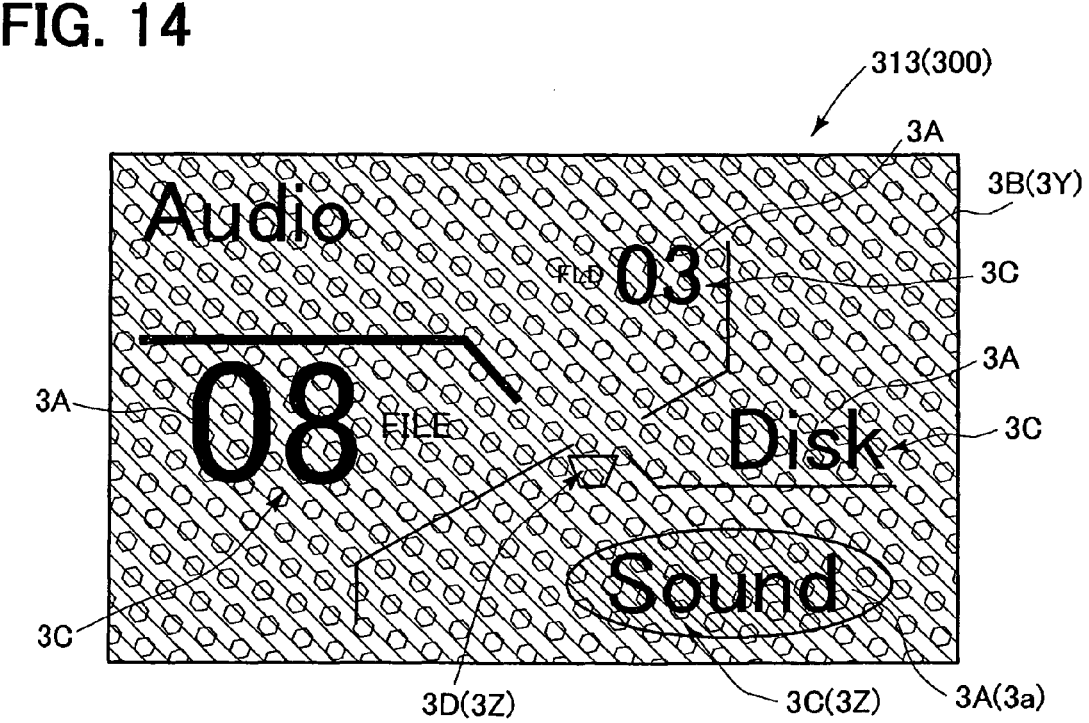
FIG. 14 is a diagram of a display window example of a low layer window which is branched from FIG. 13.
Figure 15:
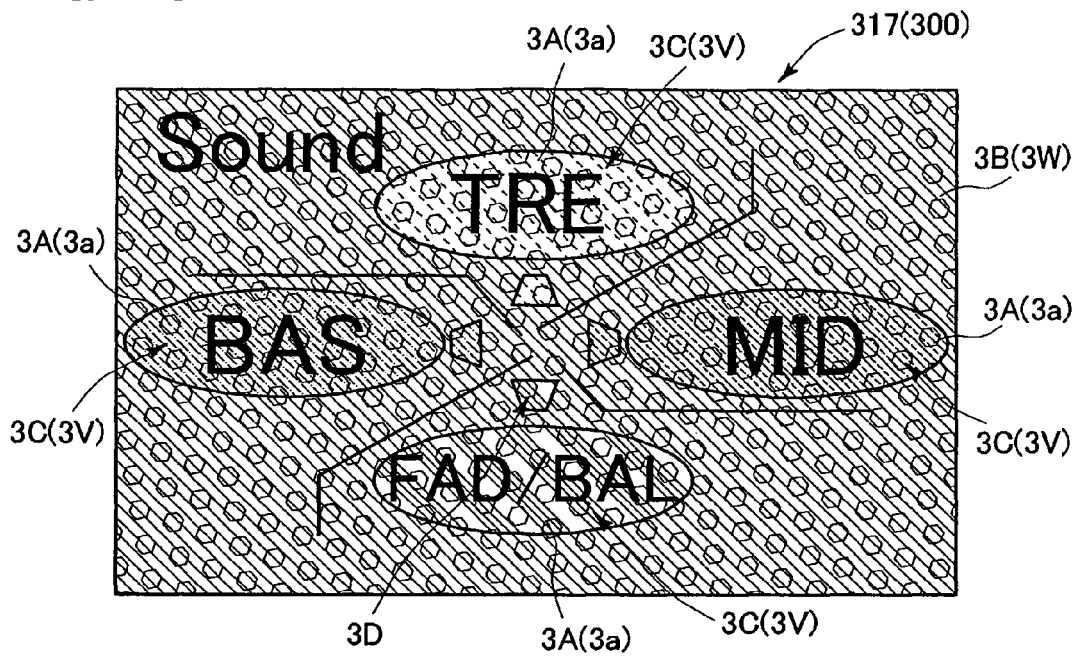
FIG. 15 is a diagram of a display window example of a low layer window which is branched from FIG. 14.

FIGS. 13 to 15 show examples which illustrate hierarchical displays where an association between a high layer window and a low layer window is indicated by using both a patterned design and a color. Although FIG. 13 shows a top menu window 312 (i.e., a highest layer window) comparable with the window 302 of FIG. 6, the several first correspondence images 3X have not only colors distant from each other, but also patterned designs different from each other. When in the top menu window 312, a determination input is made to a window switchover region 3a corresponding to the first correspondence image 3X is selected, the window 313 in FIG. 14 is displayed as a low layer window corresponding to the determined window switchover region 3a. In the low layer window 313 of FIG. 14, the second correspondence image 3Y (i.e., background image in FIG. 14) is displayed as an image having a color different from but a color hue approximate to the first correspondence image 3X of the window switchover region 3a to which the determination input was carried out in the top menu window 312. Further, in the low layer window 313 of FIG. 14, the third correspondence image 3Z of a window switchover region 3a existing in the window 313 is displayed as an image having a color different from, a color hue approximate to, and a patterned design identical to that of the first correspondence image 3X and the second correspondence image 3Y. In addition, the window 317 of FIG. 15 is a window of a lower layer into which the display is switched directly from the low layer window 313 of FIG. 14. In the window 313 of FIG. 15, the correspondence images 3W, 3V have a patterned design identical to and a color hue approximate to that of the window switchover region 3a to which the determination input was carried out in the window 302 of FIG. 13.

Thus, a patterned design of a window switchover region 3a to which a determination input is carried out in a highest layer window is used for correspondence images in windows of lower layers into which the display is switched. The original source of branches from which several layers derive can be thus recognized. It is difficult for a patterned design to have a marginal difference compared with a color. When several branches are repeated, it is difficult to provide a recognizable difference. Therefore, one patterned design is used for all the lower layers; it becomes possible to be associated with the contents of the window switchover region in the highest layer at least. In the case of FIG. 13 to FIG. 15, the patterned design selected in the top menu window 302 is used as the background patterned designs of all the lower layer windows.

In addition, in the above embodiment, the first correspondence image is an input image in the high layer window and the low layer window. Instead of the input image, any image may be used which has at least one of a color and a patterned design unique to a window switchover region 3a to visually indicate the existence of the correspondence relation with the window switchover region. For example, an indication image which directs the corresponding selection region 3A, an image which is arranged close to each window switchover region 3a under a standardized stipulation. In addition, the second correspondence image is used as a background image of the window. Instead of as the background image, the second correspondence image having a visual association with the corresponding first correspondence image may be displayed in a region where the correspondence with the window content display portion 3M within the window (e.g., at a proximity of the display content display portion).

Figure 16:
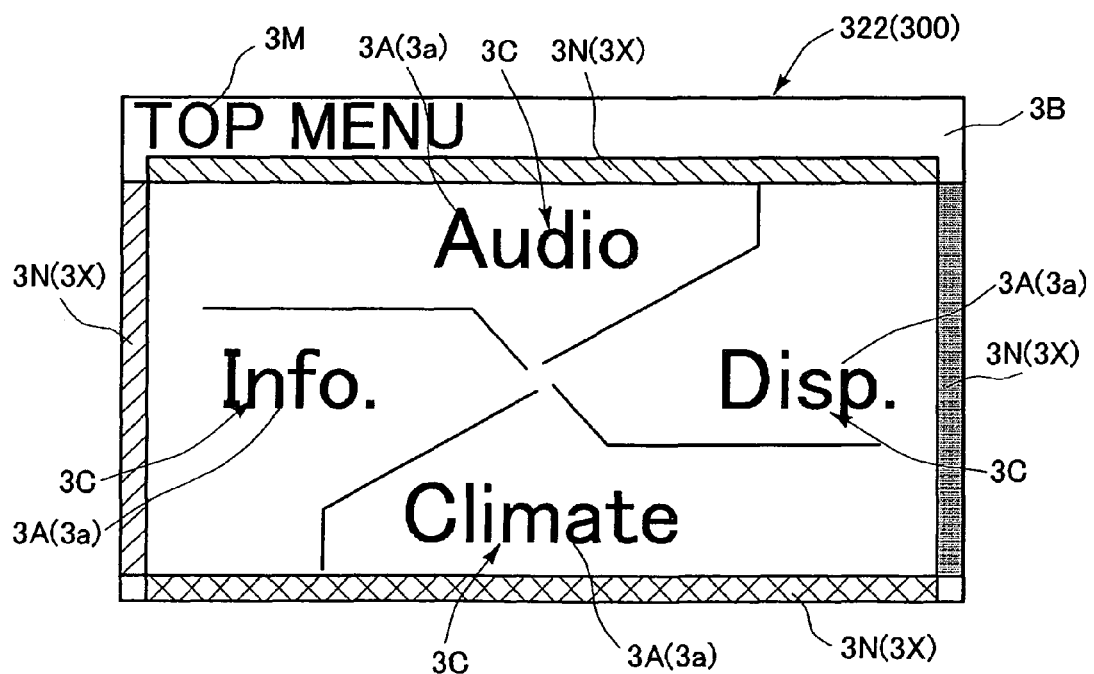
FIG. 16 is a diagram of a third display window example of a selection-use window which is displayed in the manipulation input apparatus.
Figure 17:
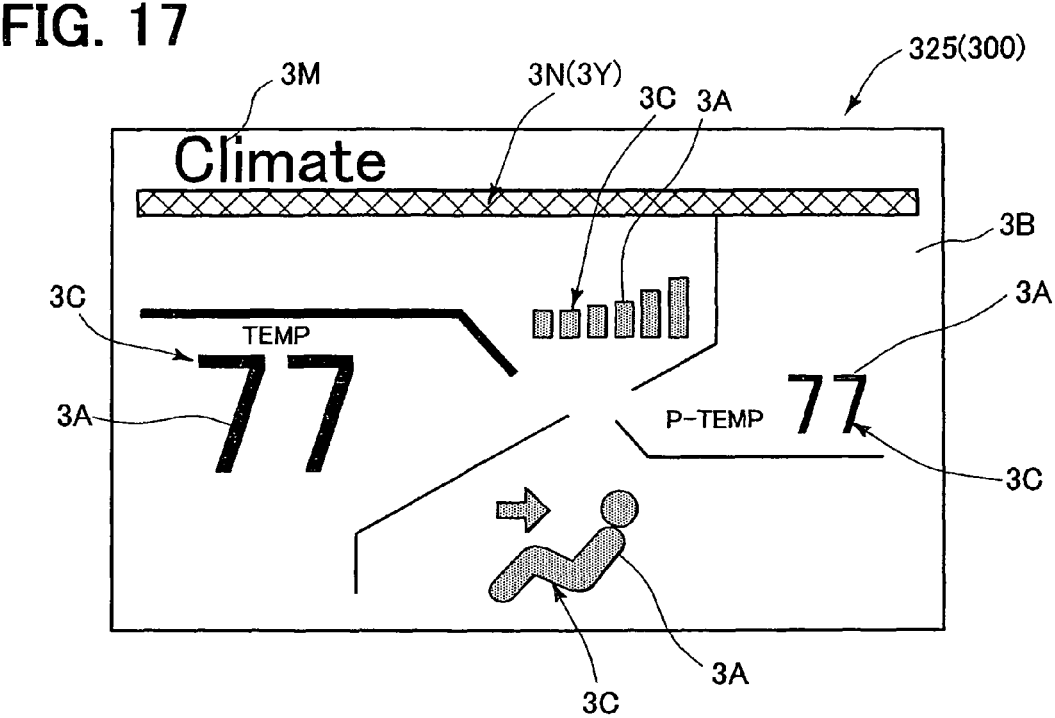
FIG. 17 is a diagram of a display window example of a low layer window which is branched from FIG. 15.

FIG. 16 and FIG. 17 show such an example. The window 322 of FIG. 16 which is a high layer window displays beltlike images 3N which is in line with outer edges as the first correspondence images 3X. In contrast, in the window 325 of FIG. 17 being a low layer window which can be transferred directly from the window 322, the second correspondence image 3Y is an image having an outer contour similar to the above beltlike image 3N (first correspondence image 3X) corresponding to the window switchover region 3a to which the determination input was carried out in order to transfer directly from the window 322 of FIG. 16. The second correspondence image 3Y is displayed in proximity of a header display portion 3M for displaying a window content using a character string in the window 325. It is noted that the second correspondence image 3Y is a beltlike image that has a color, patterned design, and width, all of which are identical to those of the corresponding first correspondence image 3X, and the second correspondence image 3Y is displayed as an underline portion of the display portion 3M.

Figure 18:
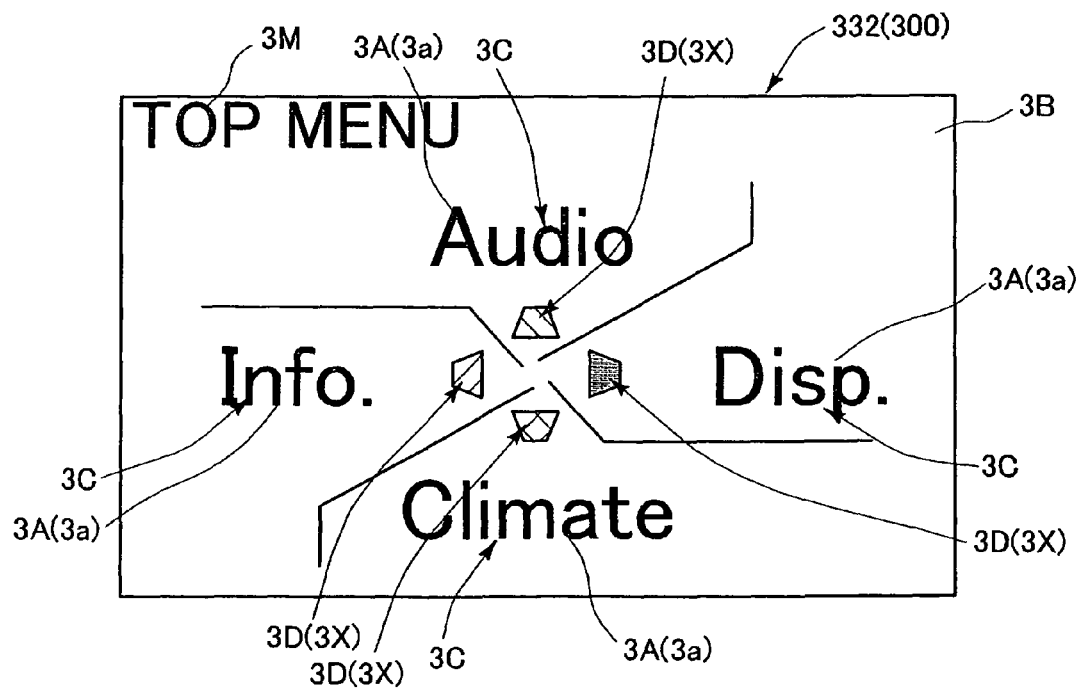
FIG. 18 is a diagram of a fourth display window example of a selection-use window which is displayed in the manipulation input apparatus.
Figure 19:
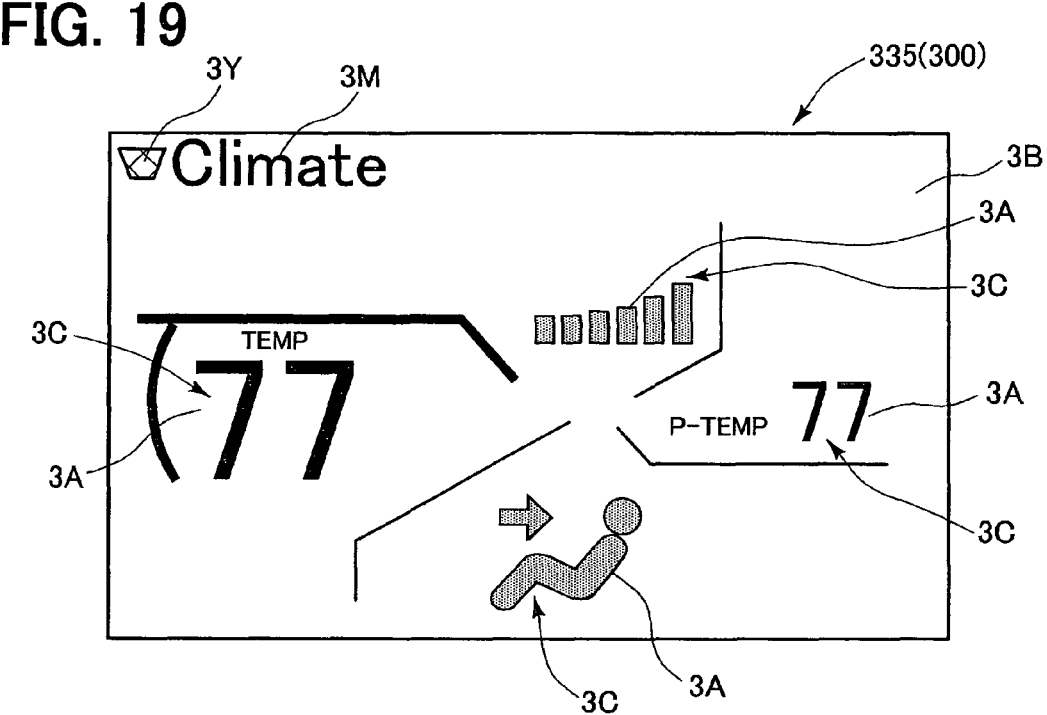
FIG. 19 is a diagram of a display window example of a low layer window which is branched from FIG. 17.

FIG. 18 and FIG. 19 also show a similar example. The window 332 of FIG. 18 which is a high layer window shows the first correspondence image 3X using an auxiliary, image 3D. In contrast, in the window 335 of FIG. 19, which is a low layer window which can be transferred directly from the window 332, the second correspondence image 3Y is an image having an outer contour similar to the above auxiliary image 3D (first correspondence image 3X) corresponding to the window switchover region 3a to which the determination input was carried out in order to transit directly from the window 332 of FIG. 18. The second correspondence image 3Y is displayed in a proximity (i.e., in front of the starting position of the character string) of a header display portion 3M for displaying a window content using a character string in the window 335. It is noted that the second correspondence image 3Y is an image that has (i) not only a color, patterned design, and outer contour, all of which are identical to those of the corresponding first correspondence image 3X, (ii) but also a size and direction, two of which are identical to those of the first correspondence image 3X.

Further, in the above embodiment, the first correspondence image and the corresponding second correspondence image have an identical chroma saturation and an identical brightness. Without need to be limited thereto, the correspondence image in a lower layer window may be reduced or thinned in respect of at least one of a chroma saturation and a brightness. Thereby, the layer depth in the hierarchical structure can be understood by the reduction of the chroma saturation or brightness.

Figure 20:
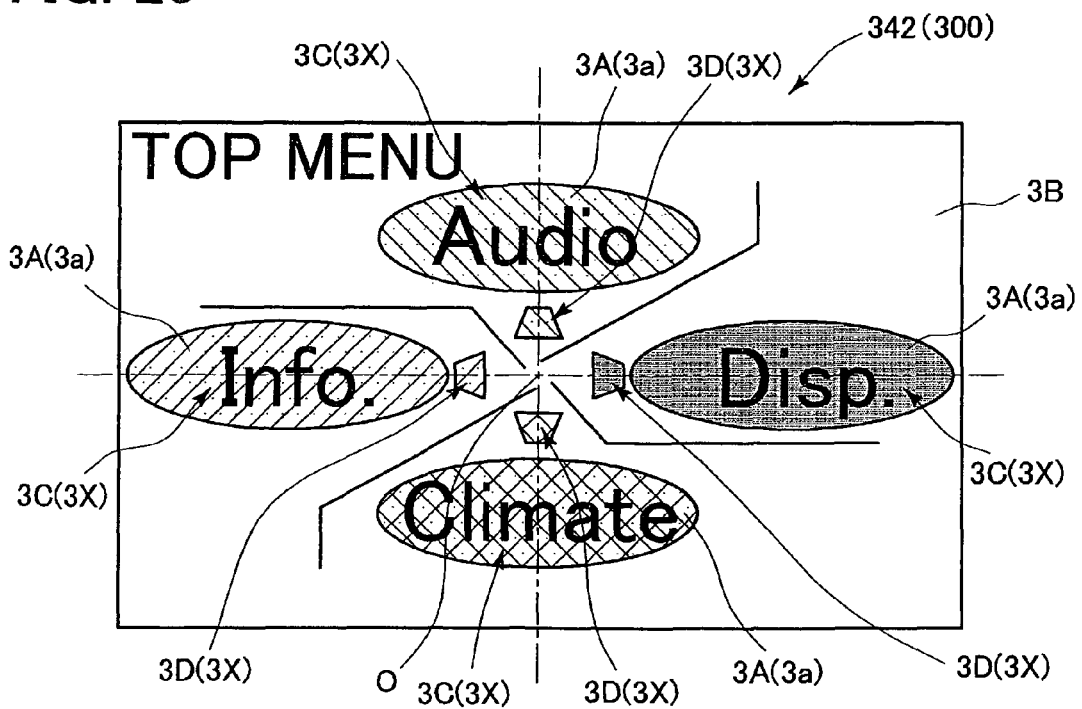
FIG. 20 is a diagram of a fifth display window example of a selection-use window which is displayed in the manipulation input apparatus.
Figure 21:
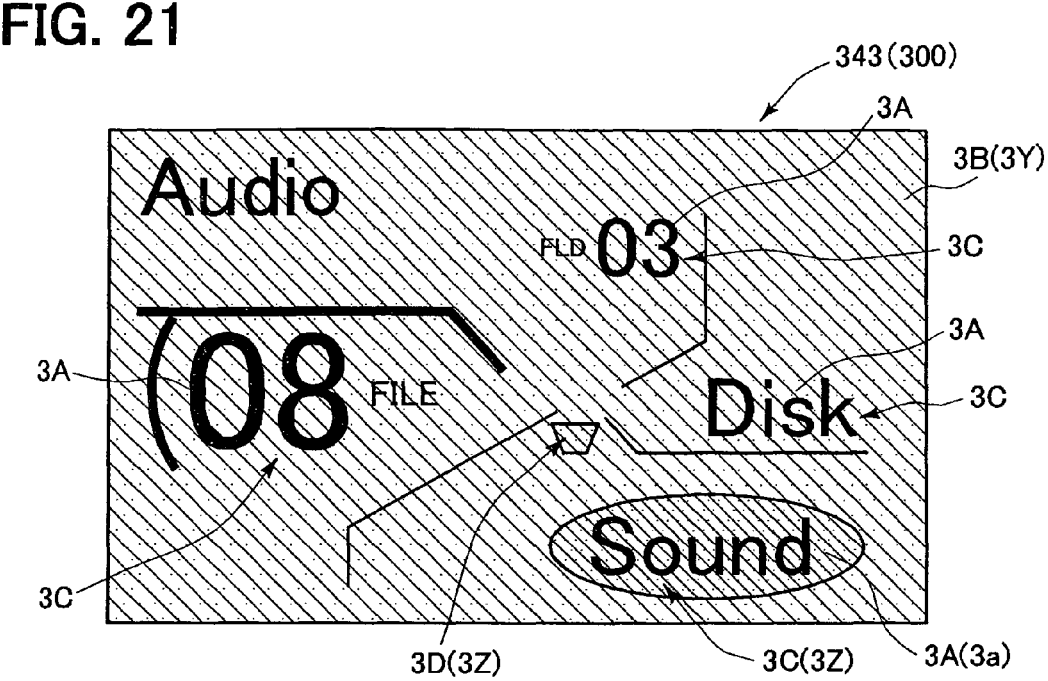
FIG. 21 is a diagram of a display window example of a low layer window which is branched from FIG. 20.
Figure 22:
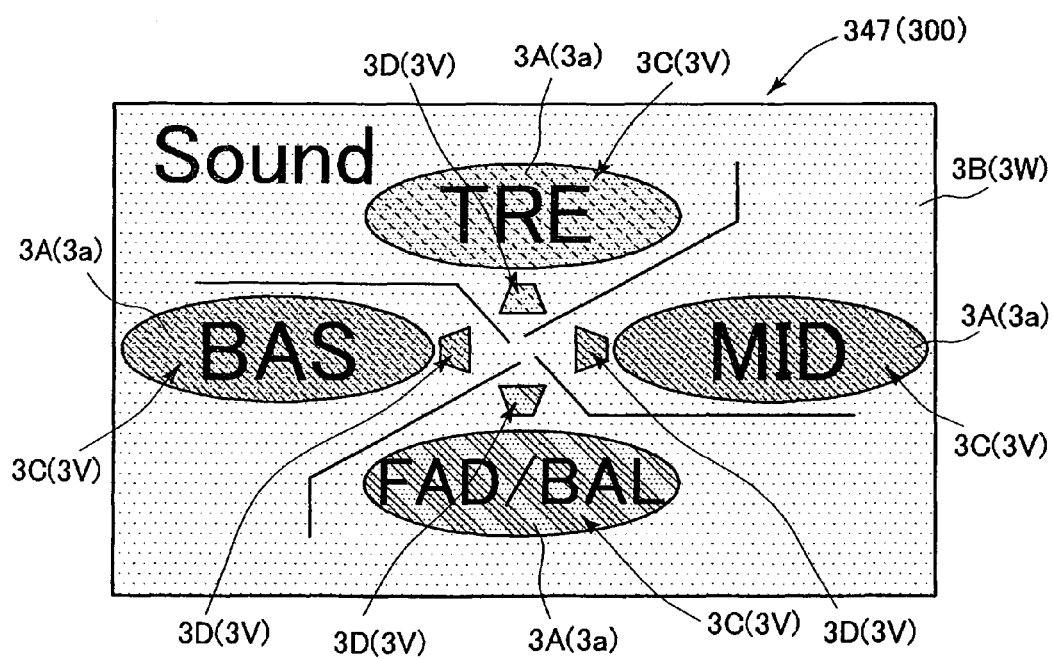
FIG. 22 is a diagram of a display window example of a low layer window which is branched from FIG. 21.

For example, (i) the first correspondence image 3X displayed in the high layer window 342 of FIG. 20 and (ii) the second correspondence image 3Y in the window 343 of FIG. 21 of the low layer window from which the display is transferred directly to the window 342 of FIG. 20 have a an identical color hue, chroma saturation, and brightness. The third correspondence image 3Z displayed in the window (FIG. 21) may have a color hue approximate to that of the first and second correspondence images 3X, 3Y, and a color of which at least one of the chroma saturation and the brightness is thinned compared with that of the first and second correspondence images 3X, 3Y. In addition, in the window of FIG. 22 of the low layer window to which the display is transferred directly from the window of FIG. 21, the fourth correspondence image 3W (second correspondence image) corresponding to the third correspondence image 3Z (first correspondence image) to which the determination input was carried out at the time of the window switchover has a color, chroma saturation, and brightness, all of which are identical to those of the third correspondence image 3Z. The fifth correspondence image 3V (third correspondence image) displayed in the window 347 of FIG. 22 where the fourth correspondence image 3W is displayed may have a color hue approximate to that of the third and fourth correspondence images 3Z, 3W while having a color of which at least one of the chroma saturation and the brightness is thinned compared with that of the third and fourth correspondence images 3Z, 3W.

In addition, in the composite manipulation device 2 in the above embodiment, the manipulation direction of the shift manipulation includes four directions of the shape of a crisscross. Without need to be limited thereto, for example, less than four directions such as two directions, or more than four directions such as eight or six directions may be adopted. However, it is preferable that the several directions are extended radially from a reference position with identical intervals. Further, the selection-use windows 300 also need to be arranged so as to respond to the manipulation directions or manipulation modes.

Under the above embodiment, the color and patterned design are fixedly assigned to the first to third correspondence images in the respective selection-use windows. Without need to be limited thereto, there may be provided a correspondence image change manipulation device or portion 25 which receives a change input manipulation to change a color of a correspondence image. The control circuit 10 may be connected to the correspondence image change manipulation device, and enable the change of the setups of the color and patterned design of the correspondence image which is displayed on each selection-use window based on the input manipulation (a correspondence color change means or section, a correspondence patterned design change means or section, and a correspondence image change means or section). The setup information of the correspondence image displayed on each selection-use window is stored as correspondence image information in an image information storage device 41 of the external storage device 4. The control circuit 10 may rewrite the correspondence image information based on the manipulation information of the setup input manipulation by the correspondence image change manipulation device 25. In this case, the correspondence image, which can be variable, may be only the first correspondence image displayed in the selection-use window of the highest layer window. The other lower layered correspondence images may have the patterned design identical to that of the first correspondence image of the highest layer window. In contrast, the color of each of the other lower layered correspondence image may be automatically designated using a predetermined algorithm such that a hue, chroma saturation, and brightness is varied within a range of a hue approximate to that of the first correspondence image of the highest layer window. It is noted that a flowchart or the processing of the flowchart in the present application includes sections (also referred to as steps), which are represented, for instance, as S100.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a non-transitory computer-readable storage media or can be downloaded via a communications network and then stored in a non-transitory computer-readable storage media.

Aspects of the disclosure described herein are set out in the following clauses.

As an aspect of the disclosure, a vehicular manipulation input apparatus is provided as follows. A display device is included to have a screen to display. A display control circuit is configured to cause the display device to display on the screen a selection-use window under a hierarchical structure, the selection-use window containing a plurality of selection regions. A manipulation device is included to select one of the plurality of selection regions in the selection-use window and perform a determination input to the selected one. Herein, the selection-use window includes a high layer window, the high layer window containing, within the plurality of selection regions, at least one window switchover region, which enables a window switchover to switch from the high layer window to a predetermined low layer window when receiving the determination input performed by the manipulation device. The display control circuit is further configured to: (i) display, in the high layer window, a first correspondence image, the first correspondence image (a) indicating visually a correspondence relation with the window switchover region, and (b) having at least one of a color and a patterned design, the at least one of the color and the patterned design being unique to the window switchover region; (ii) switch into the low layer window corresponding to the window switchover region when the manipulation device selects the window switchover region out of the plurality of selection regions and performs the determination input to the selected window switchover region; and (iii) display, in the low layer window, a second correspondence image, the second correspondence image having a visual association, in respect of at least one of a color and a patterned design, with the first correspondence image corresponding to the window switchover region to which the determination input was performed by the manipulation device.

The above visual association between correspondence images may be defined such that the correspondence images have mutually associated relation in a visual attribute. Further, in detail, the visual attribute includes at least one of a color and a patterned design. Furthermore, the above the visual association between correspondence images may be defined such that a first correspondence image has at least one (i.e., either or both) of (i) a color identical or approximate to a color of a corresponding second correspondence image and (ii) a patterned design identical to a patterned design of the corresponding second correspondence image.

Further, that two colors of a comparison target and a reference are approximate signifies that the two hues of the two colors are approximate to each other. Further, that two hues of colors are approximate to each other signifies as follows.

First, before explaining the color hues being approximate, the color hues being identical is explained as follows. With reference to "Hue Circle in JIS (Japanese Industrial Standard) Z 8721" illustrated in FIG. 23, a single color hue relative to a reference color may be defined as being within a range of ±5 ratios (also referred to as an identical hue range) in hue perception difference centering on the reference color. For example, the color 5R (red) in FIG. 23 may be used as a reference color for explanation. The color hue (i.e., "R" in FIG. 23) of the reference color 5R may be defined as being within a range of ±5 ratios between 10RP and 10R centering on 5R in FIG. 23. In other words, two colors within a range of ±5 ratios centering on a reference color are regarded as belonging to an identical color hue relative to the reference color.

In contrast, the following explains the color hues being approximate. For instance, again, with reference to "Hue Circle in JIS Z 8721" illustrated in FIG. 23, two colors within a range of ±10 ratios (also referred to as an approximate hue range) centering on a reference color in hue perception difference are regarded as respectively belonging to color hues being approximate or as being included in mutually approximate color hues. For example, the color 5R (red) in FIG. 23 may be used as a reference color for explanation, again. When a comparative color is within a range of ±10 ratios (i.e., a range between 5RP and 5YR) in hue perception difference centering on the reference color 5R, a color hue of the comparative color is approximate to the color hue of the reference color. Naturally, the above identical hue range is included in the above approximate hue range, in the explanation of the present embodiment. Further, the color unique to a region specified is defined as follows. When there is at least one other region other than the specified region, the color(s) of the other region(s) are outside of the above approximate hue range of ±10 ratios centering on the color unique to the specified region. In other words, when there is at least one other region other than the specified region, the color unique to the specified region is different from and not approximate to the color (s) of the other region(s).

Further, the patterned design may be defined as a graphic pattern which appears regularly such as a picture or graphic shape, without including a character string, or variations in color or size. That is, an identical patterned design may be defined as an image where a graphic appears repeatedly in an identical pattern within a region such as hatching. If the comparative images are different from each other in color or region size, but identical in drawing pattern of a graphic within each region, it may be defined that the comparative images each have an identical patterned design. Further, a patterned design unique to a specified region may be defined as follows. That is, when there is at least one other region other than the specified region, the patterned design unique to the specified region is different from the patterned design(s) of the other region(s).

As an optional aspect of the above vehicular manipulation input apparatus, the first correspondence image may includes a first corresponding color image that is smeared away with a color unique to the window switchover region corresponded to by the first correspondence image; and the second correspondence image may include a second corresponding color image that is smeared away with a color of which a hue identical to or approximate to a hue of a color of the first correspondence image.

The variations in color can provide a clear visual recognition in difference. Thus, the above configuration can provide an easy recognition of the association between (i) a manipulation in the high layer window and (ii) the low layer window into which the manipulation causes the window switchover.

Furthermore, the color of the first corresponding color image and the color of the second corresponding color image may be included in an identical hue of a color.

The association of the first and second corresponding color images can be understood more clearly and easily.

As an optional aspect of the above vehicular manipulation input apparatus, the first correspondence image may include a first corresponding patterned design image that is drawn with a patterned design unique to the window switchover region corresponded to by the first correspondence image; and the second correspondence image may include a second corresponding patterned design image that is drawn with a patterned design identical to the patterned design of the first corresponding patterned design image.

The accordance in the comparative patterned designs in the regions can provide a clear visual recognition. Thus, the above configuration can provide an easy recognition of the relation between (i) a manipulation in the high layer window and (ii) the low layer window into which the manipulation causes the window switchover.

Further, the first and second correspondence images may have contour-shapes similar to each other. Thereby, the association of the first correspondence image and the second correspondence image can be understood clearly visually.

As an optional aspect of the above vehicular manipulation input apparatus, the second correspondence image may be used as a background image in the low layer window.

In this case, the patterned design or color of the first correspondence image may be displayed in the low layer window while covering the whole background of the display window in the screen. The window switchover region manipulated by the high layer window can be thus understood more easily and clearly.

As a further optional aspect of the above vehicular manipulation input apparatus, the low layer window may be a selection-use window containing a plurality of selection regions, within which at least one window switchover region is included to switch from the low layer window into a window of a layer lower than the low layer window in the hierarchical structure. The display control circuit may be further configured to, when the low layer window is displayed, display the second corresponding color image while displaying a third corresponding color image. Herein, the third correspondence image indicates visually a correspondence relation with the window switchover region included in the low layer window, and has a color unique to the window switchover region in the low layer window, the color being different from the color of the second corresponding color image but having a hue approximate to a hue of the color of the second corresponding color image.

Such a configuration can provide an effect as follows. Suppose a hierarchical structure in which repetitive selection of each window switchover region displayed in each selection-use window in each of several layers enables the display of a lower layer window one by one. As the hierarchical layer descends, the color of the correspondence image is varied within the approximate hue range. The color of the corresponding color image currently displayed enables the association of the window switchover region manipulated in the higher layer window.

For instance, a hierarchical window display will be discussed which involves many branches as descending to lower layers. The branches thus arise depending on the difference in the classifications of control contents. Under the above configuration, only seeing of the corresponding color image currently displayed in the window enables the easy recognition of the association relative to the classification of the control content that is a source of the branch.

Further, the discussion will be made with respect to the corresponding colors in a lowest layer window and a lowest layer window in a hierarchical structure. The corresponding color image in the lowest layer window is displayed in a selection-use window containing several window switchover regions while corresponding to a determination-input receiving window switchover region in a one-layer higher window. The corresponding color image in the highest layer window is displayed in a selection-use window while corresponding to a determination-input receiving window switchover region. The corresponding color images in the lowest layer window and the highest layer window may be included in an identical color hue or mutually approximate color hues. Even if the window display advances or descends from the highest layer window having several window switchover regions towards any much lower layer window, the corresponding color image displayed in the window display has a color, which is designated from within a predetermined hue range and not so distant from the initial color hue. Such a configuration enables an easy recognition of the association with (i) the contents of serial manipulations made so far and (ii) the classification of the manipulation serving a source of the serial manipulations.

As a yet further optional aspect of the above vehicular manipulation input apparatus, the hierarchical structure may have a plurality of layers at least including (i) a high layer to which the high layer window, (ii) a low layer to which the low layer window, and (iii) a layer lower than the low layer. As a layer of a window displayed on the screen becomes lower in the hierarchical structure, a corresponding image contained in the window displayed on the screen may be thinned more in respect of at least one of a chroma saturation and a brightness, the corresponding image contained in the window displayed on the screen being one of a plurality of corresponding color images including the first corresponding image, the second corresponding image, and the third corresponding image.

Such a configuration enables the recognition of the depth or layer of the hierarchy relative to the presently displayed window with the degree in reduction of chroma saturation or brightness. This can provide a criteria, in ascending the hierarchical structure towards an intended layer that is much higher layer, whether to choose (i) a first manner to return first to the highest layer and then descend one layer by one layer to the intended layer, or (ii) a second manner to ascend one layer by one layer to the intended layer.

As a yet further optional aspect of the above vehicular manipulation input apparatus, the hierarchical structure may have a plurality of layers at least including (i) a high layer to which the high layer window, (ii) a low layer to which the low layer window, and (iii) a layer lower than the low layer. The first correspondence image may further include a first corresponding patterned design image that is drawn with a patterned design unique to the window switchover region corresponded to by the first correspondence image. The second correspondence image may further include a second corresponding patterned design image that is drawn with a patterned design identical to the patterned design of the first corresponding patterned design image. In each of layers defined as the lower layer and the layer lower than the lower layer within the plurality of layers in the hierarchical structure, a patterned design in a background inside of each of the corresponding color images may be identical.

It is premised that the second correspondence image is intended to represent a whole of a display window instead of each region within the display window. Like in the above configuration, the second correspondence image used as a background image of each display window can provide an easy recognition that the second correspondence image represents a whole of the display window. In this regard, however, without need to be limited to the background image. For example, the second correspondence image may be displayed at a region close to a window content displaying portion arranged in a predetermined region within the display window.

As a further optional aspect of the above vehicular manipulation input apparatus, a corresponding color change section may be configured to receive an input manipulation to change a color of each of the corresponding color images and change a setup of a color of each of the corresponding color images based on the received input manipulation.

Thereby, the color of each corresponding color image can be determined as a desired color.

As an optional aspect of the above vehicular manipulation input apparatus, the plurality of selection regions in the selection-use window may be arranged in a shape of a crisscross on the screen. The manipulation device may further serve as a crisscross manipulation portion which is enabled to be manipulated in four directions shaped of a crisscross corresponding to the plurality of selection regions displayed in the shape of the crisscross on the screen.

Thus, manipulations may be enabled to move only to directions corresponding to the selection regions. For example, this can reduce a mis-manipulation as compared with a configuration where a pointer can arbitrarily move any point within a two-dimensional area within the display window to select a selection region.

It will be obvious to those skilled in the art that various changes may be made in the above-described embodiments of the present invention. However, the scope of the present invention should be determined by the following claims.

What is claimed:

1. A vehicular manipulation input apparatus comprising:
a display device having a screen to display;
a display control circuit configured to cause the display device to display on the screen a selection-use window under a hierarchical structure, the selection-use window containing a plurality of separate selection regions; and
a manipulation device to select one of the plurality of selection regions in the selection-use window and perform a determination input to the selected one of the plurality of separate selection regions,
wherein the selection-use window includes a high layer window including a background image with the plurality of separate selection regions being displayed separately on the background image of the high layer window, the high layer window containing, within the plurality of selection regions, at least one window switchover region, which enables a window switchover to switch from the high layer window to a low layer window when receiving the determination input performed by the manipulation device,
the display control circuit being further configured to:
(i) display, in the high layer window, a first correspondence image on the background image, the first correspondence image visually corresponding to the window switchover region,
the first correspondence image having a first color different from a color of the background image of the high layer window, the first correspondence image being the only image in the high layer window having the first color;
(ii) switch into the low layer window corresponding to the window switchover region when the manipulation device selects the window switchover region out of the plurality of selection regions and performs the determination input to the selected window switchover region; and
(iii) display, in the low layer window, a second correspondence image, that automatically has a second color, the second correspondence image being a background image of the low layer window;
wherein the second color is within an approximate hue of the first color of the first correspondence image corresponding to the window switchover region to which the determination input was performed by the manipulation device.

2. The vehicular manipulation input apparatus according to claim 1, wherein:
the first correspondence image includes a first corresponding color image that is smeared away with the first color; and
the second correspondence image is smeared away with the second color.

3. The vehicular manipulation input apparatus according to claim 2, wherein
the second color is within an identical hue range of the first color.

4. The vehicular manipulation input apparatus according to claim 1, wherein
the first correspondence image includes a first corresponding patterned design image that is drawn with a first patterned design, the first correspondence patterned design image being the only image in high layer window having the first patterned design; and
the second correspondence image includes a second corresponding patterned design image that is drawn with a second patterned design which is identical to the first patterned design of the first corresponding patterned design image.

5. The vehicular manipulation input apparatus according to claim 1, wherein
the second correspondence image is used as a background image in the low layer window.

6. The vehicular manipulation input apparatus according to claim 1, wherein
the low layer window is a selection-use window containing a plurality of selection regions, within which at least one window switchover region is included to switch from the low layer window into a new layer which is lower than the low layer window in the hierarchical structure,
the display control circuit further configured to, when the low layer window is displayed,
display the second correspondence image having the second color while displaying an additional color image, the additional color image indicating visually a relation corresponding to the window switchover region included in the low layer window, the additional color image having a third color, the additional color image being the only image in the low layer window having the third color, the third color being different from the second color of the second correspondence image but being within an approximate hue range of the second color of the second correspondence image.

7. The vehicular manipulation input apparatus according to claim 6, wherein:

as a layer of a window displayed on the screen becomes lower in the hierarchical structure from the high layer window via the low layer window to the next low layer window, a corresponding image contained in the window displayed on the screen is thinned more in respect of at least one of a chroma saturation and a brightness.

8. The vehicular manipulation input apparatus according to claim 6, wherein:

the first correspondence image further includes a first corresponding patterned design image that is drawn with a first patterned design, the first correspondence image being the only image in the high layer window having the first patterned design;

the second correspondence image further includes a second corresponding patterned design image that is drawn with a second patterned design identical to the first patterned design of the first corresponding patterned design image; and a background image in the low layer window uses the second corresponding color image having the second patterned design, whereas a background image of the next low layer window has a patterned design that is identical to the second patterned design being identical to the first patterned design.

9. The vehicular manipulation input apparatus according to claim 1, further comprising:

a corresponding color change section configured to receive an input manipulation to change a color of each of the first and second correspondence images and change a setup of a color of each of the first and second correspondence images based on the received input manipulation.

10. The vehicular manipulation input apparatus according to claim 1, wherein the plurality of selection regions in the selection-use window are arranged in a shape of a crisscross on the screen, the manipulation device further serving as a crisscross manipulation portion which is enabled to be manipulated in four directions shaped of a crisscross corresponding to the plurality of selection regions displayed in the shape of the crisscross on the screen.

11. A vehicular manipulation input apparatus comprising:

a display device having a screen to display;

a display control circuit configured to cause the display device to display on the screen a selection-use window under a hierarchical structure, the selection-use window containing a plurality of separate selection regions; and a manipulation device to select one of the plurality of selection regions in the selection-use window and perform a determination input to the selected one of the plurality of separate selection regions, wherein the selection-use window includes a high layer window including a background image with the plurality of separate selection regions being displayed separately on the background image of the high layer window, the high layer window containing, within the plurality of selection regions, at least one window switchover region, which enables a window switchover to switch from the high layer window to a predetermined low layer window when receiving the determination input performed by the manipulation device, the display control circuit being further configured to:

(i) display, in the high layer window, a first correspondence image on the background image, the first correspondence image visually corresponding to the window switchover region, and the first correspondence image having a first patterned design different from a patterned design of the background image of the high layer window, the first corresponding image being the only image in the high layer window having the first patterned design;

(ii) switch into the low layer window corresponding to the window switchover region when the manipulation device selects the window switchover region out of the plurality of selection regions and performs the determination input to the selected window switchover region; and (iii) display, in the low layer window, a second correspondence image that automatically has a second patterned design, the second corresponding image being a background image of the low layer window;

the second patterned design being visually associated with the first patterned design of the first correspondence image.

12. The vehicular manipulation input apparatus according to claim 11, wherein the second patterned design of the second correspondence image is identical to the first patterned design of the first correspondence image.

13. The vehicular manipulation input apparatus according to claim 11, wherein the low layer window is a selection-use window containing a plurality of selection regions, within which at least one window switchover region is included to switch from the low layer window into a next low layer, which is lower than the low layer window in the hierarchical structure, the display control circuit further configured to, when the low layer window is displayed, display the second correspondence image having the second patterned design while displaying an additional patterned design image, the additional patterned design image visually corresponding to the window switchover region included in the low layer window, and the additional patterned design image having a third patterned design, which is identical to the second patterned design of the second correspondence image, the additional patterned design image having a color being different from a color of the second correspondence image.

* * * * *